(12) United States Patent
Dardalis

(10) Patent No.: US 6,289,872 B1
(45) Date of Patent: Sep. 18, 2001

(54) ROTATING SLEEVE ENGINE

(76) Inventor: Dimitrios Dardalis, 601 Elmwood Pl., Apt. 3, Austin, TX (US) 78705

( * ) Notice: Subject to any disclaimer, the term of this patent is extended or adjusted under 35 U.S.C. 154(b) by 0 days.

(21) Appl. No.: 09/244,603

(22) Filed: Feb. 4, 1999

(51) Int. Cl.[7] .................. F01L 7/02; F02B 75/02
(52) U.S. Cl. ............... 123/314; 123/59.3; 123/65 VS; 123/80 C; 123/190.12
(58) Field of Search ................. 123/59.3, 65 V, 123/65 VA, 65 VS, 312, 313, 314, 80 C, 190.12, 193.5, 193.4, 41.83, 41.84, 193.2, 196 V; 184/6.4, 6.8; 277/400, 465

(56) References Cited

U.S. PATENT DOCUMENTS

| | | | |
|---|---|---|---|
| 1,054,714 | * | 3/1913 | Renault .................. 123/312 |
| 1,073,640 | * | 9/1913 | Smith .................... 123/312 |
| 1,172,940 | * | 2/1916 | Cleaver .................. 123/312 |
| 1,354,101 | * | 9/1920 | Greten et al. ........... 123/312 |
| 1,614,608 | * | 1/1927 | Gloss .................... 123/80 C |
| 2,855,912 | * | 10/1958 | Stucke .................. 123/312 |
| 2,982,272 | * | 5/1961 | Stucke .................. 123/312 |
| 4,629,200 | * | 12/1986 | Ruddy ................... 277/216 |
| 5,191,863 | * | 3/1993 | Hagiwara ............... 123/59.3 |
| 5,482,011 | * | 1/1996 | Falck ................... 123/80 C |

FOREIGN PATENT DOCUMENTS

001645584 * 4/1991 (SU) ..................... 123/193.4

* cited by examiner

Primary Examiner—Noah P. Kamen
Assistant Examiner—Hai Huynh

(57) ABSTRACT

An internal combustion engine is provided including at least one cylinder having a conventional valvetrain. The valvetrain consists of at least one camshaft, at least one intake poppet valve per cylinder activated by the camshaft and at least one exhaust valve per cylinder activated by the camshaft as well. Rotably disposed within the engine block is a rotatable cylinder liner which is supported from the block with at least two journal bearings. A piston is mounted in each liner for reciprocating movement therein. A connecting rod connects each piston to a crankshaft converting the reciprocating motion to crank rotation. The sleeve rotates with the objective of improving the lubrication conditions of the piston rings and piston. The reduction in friction coefficient between the piston rings and liner at certain portions of the cycle will result in significant frictional benefits. The motion of the liner will result in continuous fluid lubrication which results in severe reduction of piston ring and liner wear.

26 Claims, 9 Drawing Sheets

Figure 6
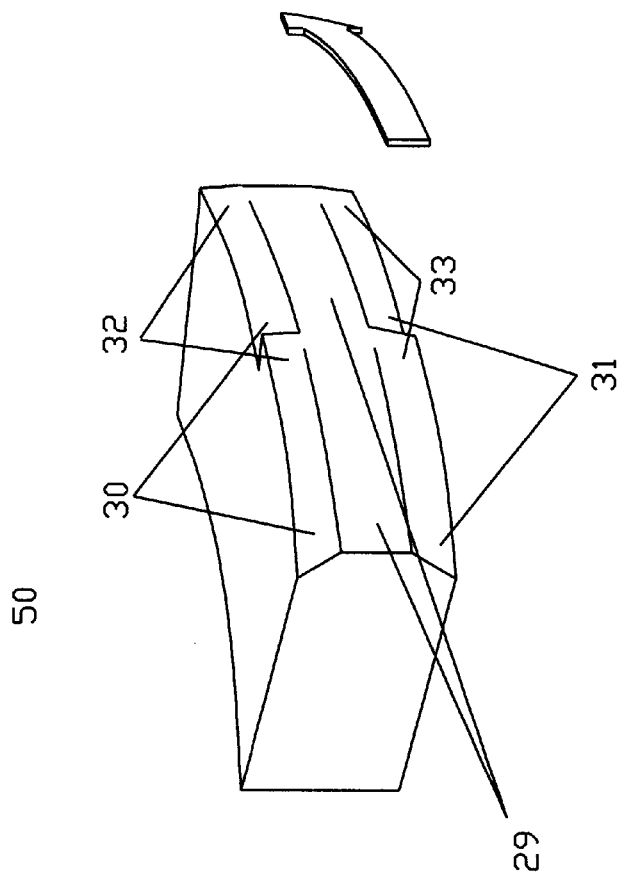
Figure 6B
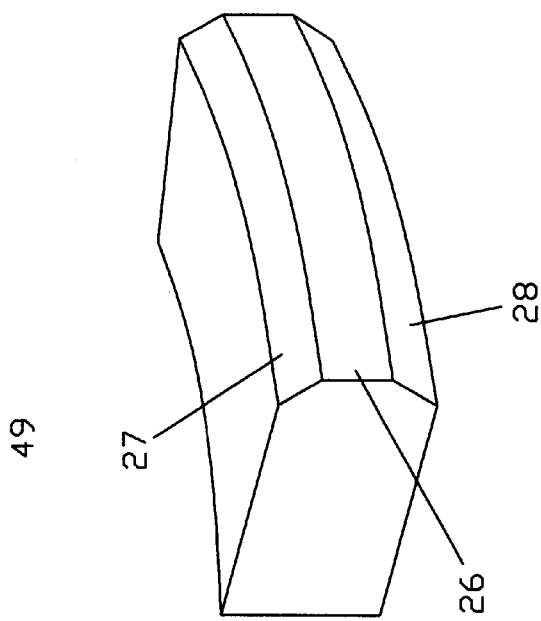
Figure 6A

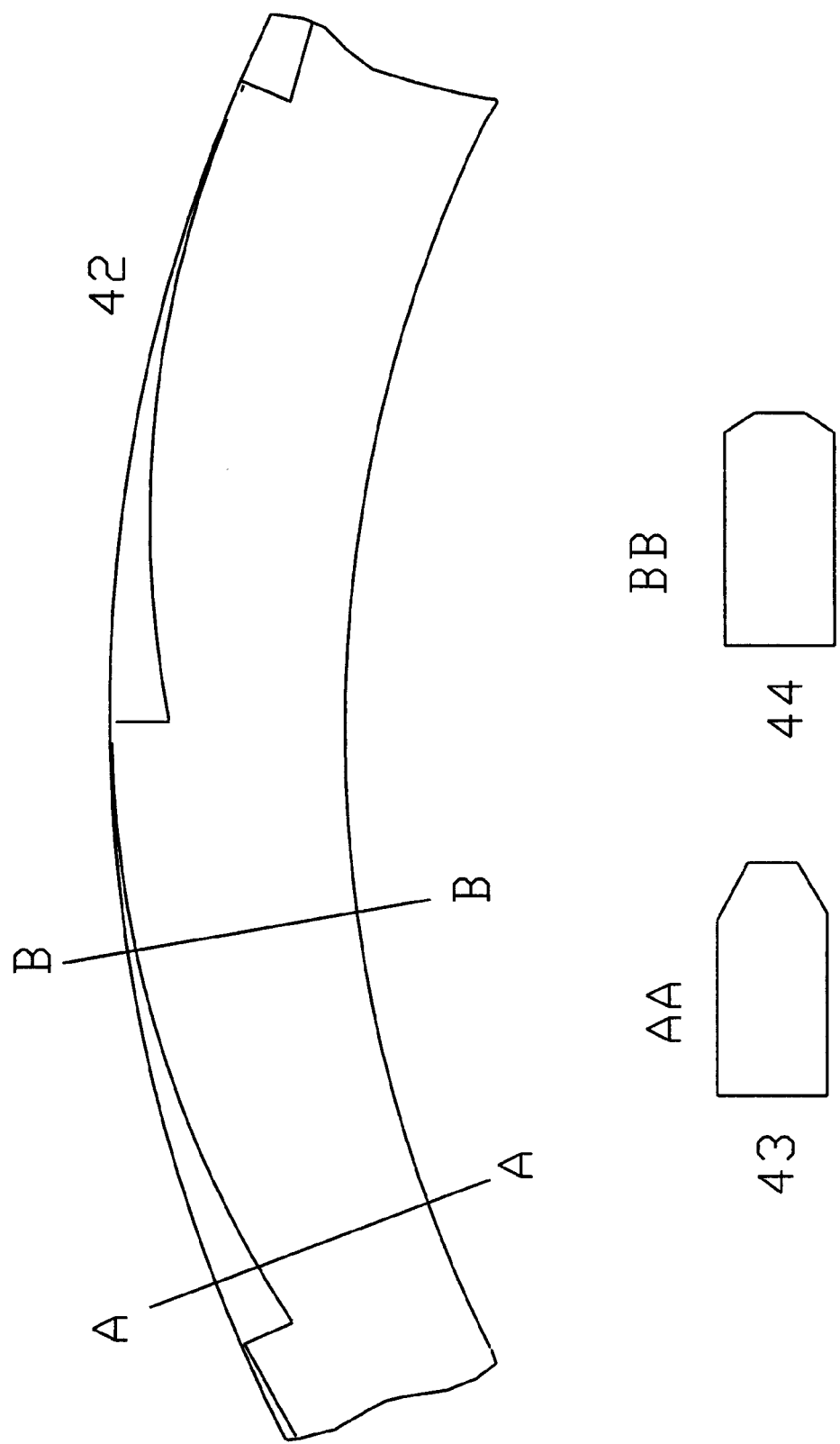

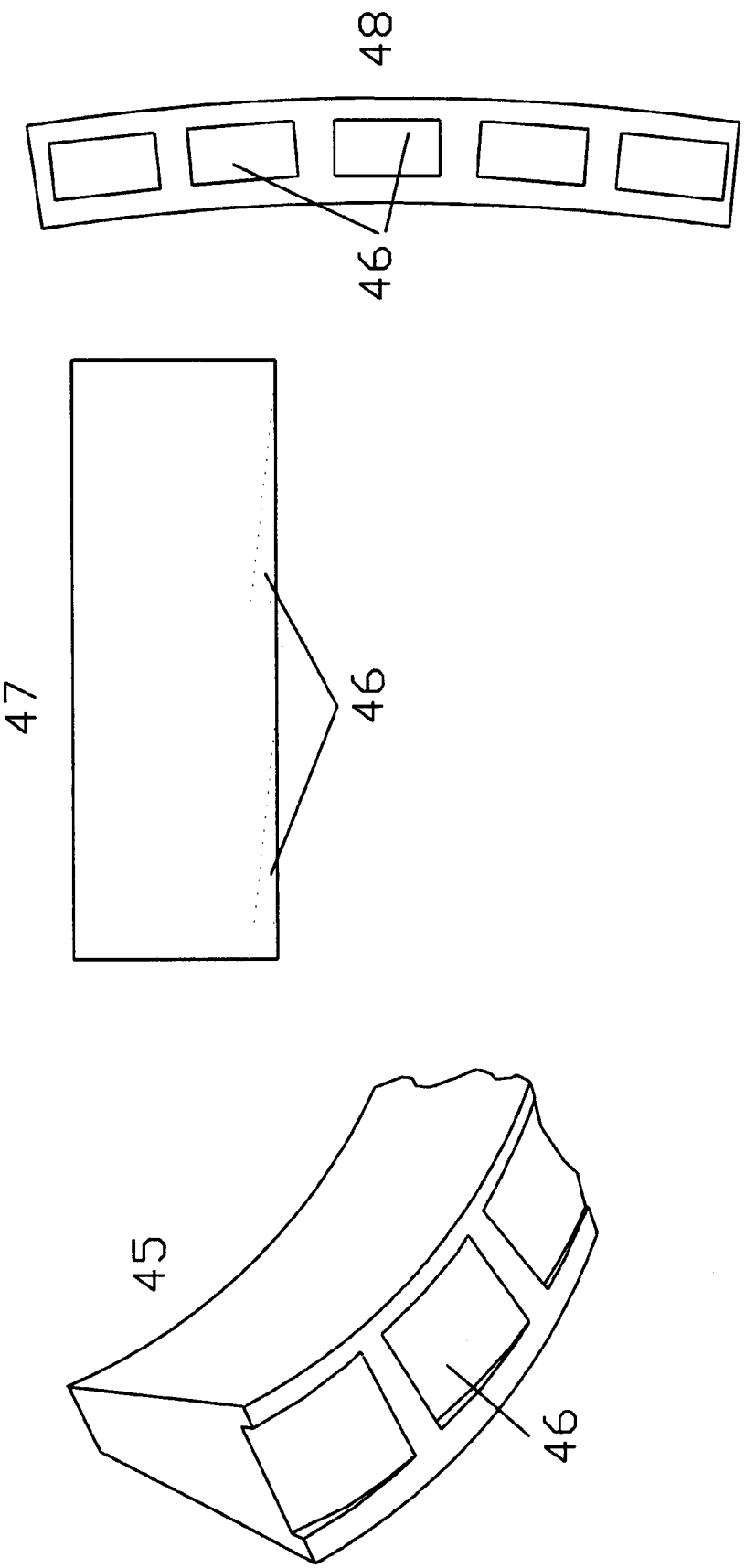

ROTATING SLEEVE ENGINE

FIELD OF INVENTION

The invention pertains to an internal combustion engine being typically conventional but having a cylinder liner that rotates with the intention of reducing piston assembly friction and piston ring and liner wear.

BACKGROUND OF THE INVENTION

The useful work of internal combustion engines is limited by their mechanical efficiency. On average, about 85% of the work available on the piston at full load is available as useful work on the flywheel due to internal engine friction. At lower loads, the above figure is even lower. Piston assembly friction (piston and piston rings) alone can account for up to 75% of the overall mechanical losses. Thus, piston friction reduction is highly desirable. Furthermore, engine parts are subject to wear that eventually limits the engine power and efficiency as well as increasing oil consumption, and increasing exhaust emissions. The most critical wear occurs on the piston rings and cylinder liners. Excessive wear requires engine overhaul or replacement. Thus, liner and ring wear reduction is also highly desirable.

Piston rings have two primary functions: Limiting oil flow into the combustion chamber and minimizing blowby (leak of high pressure combustion gas from the combustion chamber into the crankcase). Both functions are accomplished as high pressure combustion gases force the rings against the cylinders and the lower part of the piston groove and thereby seal the relatively large clearance between piston and liner. The top ring is subject to the highest pressure loading and thus suffers the most wear and has the largest contribution in friction.

The "rotating sleeve engine" is an invention that can significantly improve the lubrication conditions of the piston and piston rings, eliminate or significantly reduce wear and significantly reduce piston assembly friction.

In reciprocating piston engines, the piston linear speed is reduced to very low values at the regions with proximity to top and bottom dead centers. In those parts of the stroke, the sliding speed between the compression rings and the liner is insufficient for the maintenance of hydrodynamic lubrication. The protective lubricant film gradually breaks down and metal to metal contact occurs. The high cylinder pressure during the compression and power strokes loads the compression rings further, intensifying the phenomenon and expanding the portion of the stroke where the metal to metal contact occurs. Thus, localized wear on the liner around the dead centers and especially at the top is typical after prolonged engine operation. At the regions around the mid portion of the stroke, the piston speed reaches sufficient values for the hydrodynamic lubrication regime. The protective lubricant film prevents metal to metal contact, reduces the friction coefficient by up to two orders of magnitude, and essentially eliminates wear. This can be verified by the fact that the mid portion of the liner is always free of wear. Numerous frictional experiments reveal increased piston assembly friction around the dead centers due to the described phenomenon.

The above phenomenon is further illustrated by the Stribeck diagram shown in FIG. 1 as presented by Irving J. Levinson, *Machine Design*. This diagram shows the friction coefficient between two sliding surfaces in the presence of lubricant as a function of the "duty parameter" which is defined as the product of sliding speed and lubricant viscosity divided by the normal contact pressure of the surfaces. When two surfaces slide in the presence of lubricant, three possible modes of lubrication are possible. At very low sliding speed and high normal load, boundary lubrication is present. Metal to metal contact is unavoidable. Due to surface adhesion, high level of friction and wear is present. As sliding speed and thus the duty parameter increases, hydrodynamic oil film pressure builds up, supporting a larger portion of the normal load. Thus, the two surfaces are gradually separated by the oil film with less and less asperity contact and reduced adhesive wear (mixed regime). Finally, at higher sliding speeds (duty parameter values of 50 or higher according to the Graph 1), the hydrodynamic pressure supports the entire load resulting in full separation. The metal to metal contact as well as wear are eliminated. In the part of the cycle when the piston approaches a dead center, the sliding speed approaches zero. Furthermore, when the piston is in proximity to the top dead center, compression-expansion stroke, the high cylinder gas pressure increases the normal load between the liner and the piston rings (which are practically pressure activated sealing devices) further reducing the value of the duty parameter. The result is that for a significant portion of the cycle, the duty parameter falls bellow the value of 50, with the corresponding high friction coefficient and level of wear.

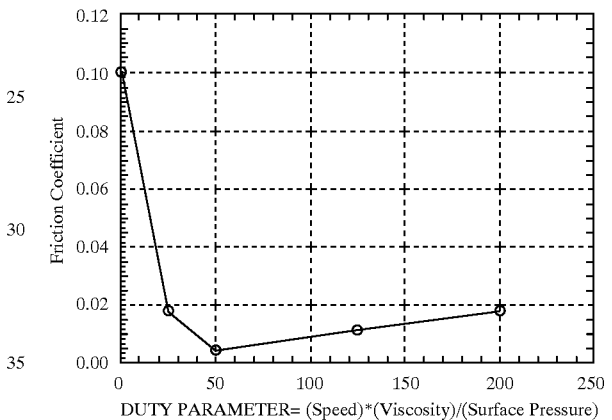

Graph 1. Stribeck diagram

The cylinder liner (also called the "sleeve") of the rotating sleeve engine rotates with the objective of maintaining a non zero sliding speed and large values of duty parameter throughout the stroke. According to the Stribeck diagram, the friction coefficient is reduced by almost two orders of magnitude for that particular portion of the stroke. The rotation can be achieved via gear mechanisms from the crankshaft (similarly to a distributor or injection pump). For best results, the magnitude of the rotation needs to be high enough in order maintain the hydrodynamic lubrication regime between the compression rings and liner, even when the piston linear speed is zero and the cylinder pressure is at its maximum value.

In conventional engines, the rings must be free to rotate to minimize localized ring wear. However, both blowby and, for spark ignition engines, hydrocarbon emissions are affected by the relative azimuthal positions of the end gaps of the compression rings (Roberts and Matthews, 1996). When the rings are free to rotate, the engine designer cannot take advantage of these dependencies to help control blowby and hydrocarbon emissions. For the rotating sleeve engine, the rings can be pinned to prevent their rotation (which is no longer required to minimize wear).

In order to further investigate the feasibility of hydrodynamic lubrication just due to sleeve rotation, the Reynold's partial differential equation as shown by Hamrock (1994) was solved numerically in a situation that simulates a stationary piston ring subject to cylinder gas pressure while the liner rotates. The objective of the simulations is to explore the magnitude of the average hydrodynamic pressure obtainable by different liner sliding speeds and different ring profiles with a constant film thickness. The value of that pressure represents the maximum gas pressure that can be supported by the ring and still maintain the assumed film thickness. This pressure is the cylinder pressure at top dead center (TDC) compression stroke and is nearly equal to the peak cylinder pressure. The constant film thickness eliminates the contribution of squeeze film lubrication in the hydrodynamic film pressure and thus represents the worst case scenario for the rotating sleeve engine. It is as if the piston stays at top dead center indefinitely while the top compression ring is constantly loaded with high gas pressure The value for the lubricant viscosity was for a 20W oil as given by Hamrock (1984). This is a low viscosity lubricant that minimizes the hydrodynamic losses at mid stroke. A flat piston ring profile was assumed with surface irregularities as the only means for pressure build-up. This phenomenon is called "microhydrodynamic lubrication" Hamrock (1984). The surface irregularities were set equal to the combined surface roughness used by the ring-pack modeling performed by Tian and coworkers (1996) of 0.3 microns. The irregularities were assumed to be on the liner surface only (while the ring surface was assumed to be perfectly flat) and their shape was a 2 dimensional sinusoidal wave. With a 3 m/s liner sliding speed and a mean film thickness of 1 and 0.8 microns (within the range of hydrodynamic lubrication for this size of the combined asperity size according to Tian and coworhers) the average lubricant pressure was 16.03 and 28.27 atm respectively. Furthermore, the average pressure demonstrated an almost proportional variation with liner speed.

In order for the lubricant film of 0.8 microns minimum film thickness and with low viscosity oil to be able to support the typical peak pressure for spark ignition engines of about 50 atm, liner speeds of over 6 m/s are necessary. For heavy duty engines where the peak cylinder pressure can reach 100 atm, even higher speeds would be required. Note that if the liner speed is not sufficient for the peak cylinder pressure, the film thickness will further drop with some metal to metal contact at dead center. However, the boundary lubrication will be still confined to smaller part of the cycle, where the piston speed is nearly zero, and thus the energy losses due to boundary lubrication are still minimized.

In a preferred embodiment, a new ring profile is incorporated in order to enhance hydrodynamic pressure with lower liner speeds. In a conventional engine, the top compression ring is equipped with a barrel shape with the intention of creating converging surfaces (FIG. 6A) that enhance the build up of hydrodynamic lubricant pressure due to the up and down motion. Note that the depth of the barrel is ony 20 or 30 microns, and thus the profile looks perfectly flat to the naked eye. For the rotating sleeve engine, the depth of this shape can vary in the peripheral direction periodically as shown in FIG. 6B in order to create converging surfaces in the direction of sleeve rotation. Note that the shape is actually curved rather than angular as shown in FIG. 6. At a point of maximum depth, the barrel shape remains like a typical compression ring. However, this depth drops linearly with peripheral displacement, until the barrel shape is reduced to a perfectly flat surface. Then, suddenly, the barrel shape is reintroduced and the same process repeats periodically. The result is that multiple "wedges" or converging surfaces are formed that enhance hydrodynamic pressure due to sleeve rotation. The length of these wedges along the periphery of the ring range between 1 and 1.5 ring widths.

The Reynold's equation was solved again for the new profile. With a film thickness of 0.8 microns and a sliding speed of 3 and 4 m/s, the average lubricant pressure was 88.10 and 110.82 atm respectively. Smaller film thickness and higher sliding speeds yield even higher pressure. As discussed above, if the slight piston motion present around dead center and squeeze film lubrication are included in the problem, similar hydrodynamic film pressure and/or higher minimum film thickness can be achieved for the short period of time that piston sliding speeds are low and cylinder gas pressure is high, with lower liner rotational speeds.

The above simulations indicate that hydrodynamic lubricant film pressure can be created at TDC or BDC just by the surface irregularities, even for a moderate liner rotation (3m/s corresponds to 409 rpm for a 5.5 inch bore engine) and with a low viscosity lubricant. With the proposed ring profile, the lubricant pressure can be dramatically increased even with a relatively large film thickness reaching the magnitude of typical peak cylinder pressure for heavy duty diesel engines at full load. Note that the proposed ring profile increases the flat portion of the ring improving sealing and increasing the effectiveness of squeeze film lubrication at dead center. Part of the converging surface that enhances hydrodynamic lubrication due to up and down motion has been sacrificed. However, results from the models by Tian and coworkers (1996), Lawrence (1988) as well as several experimental studies indicate that there is more than sufficient film thickness at mid-stroke for hydrodynamic lubrication. Furthermore, since at least some liner rotation will be retained at mid-stroke, the converging surfaces at the peripheral direction will remain active and substitute for the overall reduction of the barrel shape.

Moving sleeves have been proposed for use in prior internal combustion engine patents. However, in the prior art, the objective of sleeve motion is replacement of the conventional poppet valves with intake and exhaust slots that are exposed by the motion of the liner. For example Giorgio in U.S. Pat. No. 5,482,011, discloses an engine design where a liner rotates inside the engine block. The liner is tightly fitted on the block and is provided with a port which is aligned with similar ports on the block for the intake and exhaust processes. The rotational speed of the liner is restricted to one half the crank speed due to timing requirements. Akira in U.S. Pat. No. 5,191,863 describes an engine design with a ported rotating liner used for intake and exhaust processes. Again, the liner's motion is restricted by timing.

Some of the existing moving sleeve engines can show some improvements in the piston lubrication in respect to a stationary liner when sleeve rotation occurs at the dead centers, even though that was not the objective of the invention. An example is the series of sleeve valve engines developed by Ricardo before WWII (U. S. patent unknown) which shows great similarity to the engines described by Giorgio and Akira. However, in all these designs, the sleeve motion can not be optimized for friction optimization due to timing restrictions. Furthermore, even though Ricardo and coworkers (1968) reported some potential benefits in that particular design in terms of piston friction, the tight tolerances between the liner and block throughout the liner external area (necessary mainly due to the sealing requirements of the port openings provided on both the sleeves and stationary cylinders) introduced large loads on the driving mechanisms, minimizing the potential frictional benefits.

The ported engine designs shown by Richardo and coworkers as well as other US patents are using oil for the lubrication of the outside sleeve surface. Relatively large quantities of oil can be expected to enter the intake and exhaust flows through the ports. However, the oil consumption and resulting hydrocarbon emissions will not be compatible with modem US regulations. If different means of lubrication of the sleeves of the ported engines is attempted in order to avoid the excessive oil consumption (i.e. solid lubricant or dry lubrication), the advantages on wear and low friction coefficient inherent in fluid lubrication will not be present. The present invention incorporates conventional valvetrain, which prevents oil from entering the flow of intake or exhaust gasses.

In order to further support the usefulness of the invention, a study in the scientific literature concerning engine lubrication has been performed and demonstrated in the following pages. Issues of the design and operation of sleeve valve engines as related to engine lubrication are reported as published in relevant literature. The sources of piston ring wear are further analyzed. Also, the frictional savings due to the elimination of the friction component due to metal to metal contact of the piston rings with the liner have been estimated. The additional friction due to rotation has also been estimated and when compared to the frictional savings, it is smaller.

Background on Moving Cylinder Sleeves

Moving sleeves are not a new or untried engine feature. Ricardo and Hempson (1968) describes in detail the highly successful "sleeve valve" engines developed in the period between WWI and WWII and during WWII, mostly for aircraft applications (spark ignited engines). The objective of that design was the replacement of the conventional valve train and poppet valves. The motion of the sleeve would expose intake and exhaust slots at the right time in the cycle. The main advantage for aero engines was the reduction of the frontal area of the engine by the elimination of the rocker and/or overhead cam mechanisms. The shape and motion of the sleeves was designed in order to optimize the port exposure. A crank rotating at half the engine speed was connected by a ball joint to the sleeve, causing it to reciprocate and twist (at top dead center compression stroke, the sleeve's motion was momentarily purely rotational). Other advantages of these engines included central spark plug placement for denotation reduction and volumetric efficiency improvements. A second set of rings was necessary in order to seal the sleeve-cylinder head gap. This ring-pack was installed on the cylinder heads and was stationary.

During the early 20's two experimental single cylinder engines were constructed in Ricardo's laboratory in order to further explore the potential of the sleeve valve concept. One was a conventional poppet valve engine with 4 valves, the other a sleeve valve engine. The two units were similar in every other respect. During the test, it was discovered that a "puzzling" feature of the sleeve valve engine was its lower frictional losses, in spite of the larger number of moving parts and large rubbing surfaces. Ricardo attributed this effect to the possibility of elimination of piston ring boundary lubrication due to the continuous ring-liner motion and continuous fluid lubrication of the rings. That theory was confined by the observation that the sharply localized wear, always found in the liners of poppet-valve engines at the point where the top piston ring comes to rest at top dead center, was absent in the sleeve valve. Later tests on large number of sleeve- and poppet-valve engines of various shapes and sizes indicated that the overall mechanical losses of the sleeve-valve engine were usually less than those of the poppet-valve. According to Setright (1975), the Bristol "Centaurus", a radial 18 cylinder air cooled high performance aero engine is holding the record for the longest operation between overhauls for a piston aero engine (3000 hours). Furthermore, the Nappier Sabre, a 24 cylinder liquid cooled high performance sleeve valve aero engine could maintain its combat rating almost indefinitely due to improved piston lubrication, while engines of the period with similar or lower Brake Mean Effective Pressure (BMEP) could maintain combat rating for only 5 minutes.

Evidence from the sleeve valve engines also indicates that the maintenance of hydrodynamic lubrication of the compression piston rings by the liner motion is feasible even with the relatively low rate of liner rotation that those engines had when the piston was at top dead center (TDC) compression-expansion stroke. Thus, wear protection of piston rings and liner is also feasible. Also, in the previous design, the primary function of the sleeve motion on the sleeve valve engines was not friction reduction. The clearance between sleeve and block was held low for gas sealing purposes around the intake and exhaust ports that were drilled on the sleeves and block. In the current invention, the sleeve- block clearance can be chosen for friction optimization. Drawings of the sleeve valve engines reveal large rubbing surface between the block and sleeve. The current invention reduces this rubbing area (by the introduction of the journal bearings) to the minimum necessary for fluid lubrication, and optimizes the sleeve motion for piston friction as well as sleeve friction. Thus, much higher frictional benefits are possible. Also, the reduction or elimination of metal to metal contact at TDC in those sleeve valve engines was possible due to the relatively low peak cylinder pressure typical of a spark ignition engine (compression ratio of about 6.5:1). In order to achieve the same effect in a turbocharged heavy duty diesel engine with a compression ratio of 15:1 or higher and peak cylinder pressure of about 100 atmospheres, higher rates of rotation and/or the proposed ring profile will be necessary.

Squeeze Film Lubrication

Lawrence suggests the possibility that "squeeze film" lubrication can protect the compression rings even at the critical moments when the piston approaches a dead center under certain operating conditions. Squeeze film lubrication is a tribological situation where, even though the sliding surfaces suddenly come to a complete stop, due to lubricant viscosity and inertia, the surfaces could still remain separated for a certain amount of time.

However, experimentation by Gauthier and coworkers (1987) on a diesel engine indicate that squeeze film lubrication can completely prevent metal to metal contact only if very high viscosity lubricant is used. However, when the lubricant viscosity is increased, hydrodynamic piston friction at mid stroke will increase dramatically, with a strong penalty in overall engine efficiency. Furthermore, typical lubricants cannot maintain that level of viscosity at operating temperature. Experiments by Mitsumoto and coworkers (1989) on diesel engines also show that increasing the lubricant viscosity improves the durability of the engine, with a penalty in efficiency.

Similar studies performed on spark ignited engines (Takiguchi et al., (1988); Ku et al., (1988); Ohmori et al., (1993)) show that squeeze film lubrication cannot prevent metal to metal contact of the compression rings under any operating condition. However, slight reduction of wear followed by an increase in overall friction was observed when the lubricant viscosity is increased.

The fact that squeeze film lubrication is possible under extreme conditions on diesel engines with higher viscocities, and unlikely in spark ignition engines is mainly due to the ring design differences. The design of diesel engines is dominated by durability requirements, and thus they are generally equipped with wider compression rings. The larger surface area will enhance the squeeze film lubrication. However, a wider ring will also exhibit higher hydrodynamic friction at mid stroke. With a rotating liner, dependence on squeeze film lubrication will be minimized. Therefore, the piston ring width can be reduced without any durability trade offs. Thus, the mid-stroke hydrodynamic friction of diesels (which seems to be relatively large in respect to spark ignition, as shown bellow) can be also reduced with the new concept.

Boundary Contribution

In the current invention, the friction reduction is achieved mainly by the elimination or severe reduction of the boundary contribution in piston ring friction. A comprehensive literature review was conducted in order to estimate the contribution of boundary lubrication in the total piston friction in different kinds of engines and operating conditions.

In order to illustrate the typical piston friction behavior and the boundary lubrication at the dead centers, the crank-angle resolved data by Ku et al. for a 4.1 liter Cadillac spark ignition engine at 2000 rpm, light load are presented in Graph 2. A complete thermodynamic cycle is shown (two complete crankshaft revolutions). The x-axis shows crank angle degrees (dead center at 0, 180, 360, 560, and 720). The y-axis show piston friction force (N) and piston speed (m/s*10). The spikes at top dead centers clearly indicate the existence of asperity contact and boundary lubrication. Please note that in many similar experiments on different engines and operating conditions, those spikes are more clearly defined. The doted line shows the calculated instantaneous piston speed. The flat line (that alternates values between 0 and 10) shows where the friction can be considered predominantly hydrodynamic (value of 0) and boundary (value of 10).

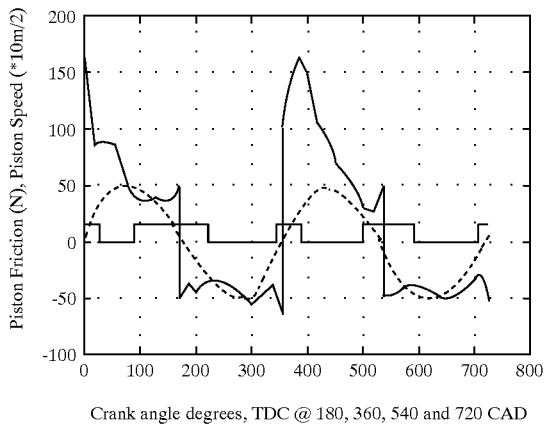

Crank angle degrees, TDC @ 180, 360, 540 and 720 CAD

Graph 2. Piston assembly friction on a 4.1 liter Cadillac V8 engine

For different operating conditions, the boundary and hydrodynamic contributions are continuously varying. Clearly, the hydrodynamic contribution is increasing with speed. Patton et al. suggests a nearly linear variation of the hydrodynamic friction torque portion with engine speed for spark ignited engines. This is supported by a number of experimental results (Patton) as well as the Stribeck diagram. Patton also suggests that the hydrodynamic portion is not sensitive to engine load. The piston friction which is the largest contributor of the hydrodynamic portion due to its larger than the rings rubbing area could be affected by load by the reduction of the oil film thickness in the thrust side during the power stroke. However, the film thickness will increase on the anti thrust side, making the overall effect not as severe. From the Stribeck diagram, it can be seen that if in a situation well into the hydrodynamic regime the load increases, the friction coefficient drops. It is unclear what will happen to the friction force (which is the product of normal load and friction coefficient) but it is clear that the sensitivity is not as high as the boundary friction where the friction coefficient is flat (if well into the boundary regime) or rapidly increasing with load (if in the mixed regime where the friction coefficient could be very sensitive to the duty parameter, and thus load). Thus, it seems justified for Patton et al. to attribute the piston assembly fmep (friction mean effective pressure) increase due to increasing load entirely on increase of boundary friction. This may not be entirely accurate for reasons described above, but it seems like a reasonable assumption.

In contrast with spark ignition engines, the piston assembly finep for diesel engines does not always increase with increasing load. Ball et al. conducted friction experiments on two 1.6 liter automotive engines, one diesel and one spark ignition. Although in the second case, the friction increased with load, it decreased in the second. This was attributed to the fact that the lubricant viscosity on the cylinder walls dropped due to the increased temperatures at higher loads. Thus, even though the boundary friction increased due to the increased gas loads on the rings, the hydrodynamic portion dropped even more. Gauthier et al. also supports the competing effects of increasing temperature and gas loading. In their measurements, the total piston friction was insensitive to load. This effect was not as apparent in Marek et al.'s experimental results. In their case, the gas loading term prevailed and the friction increased with load (in spite of the fact that they held the oil sunp temperatures lower than normal operating conditions, and thus amplifying the hydrodynamic effect). At 980 rpm, the friction at full load was 31.4% higher than the motoring conditions. The different behavior of these two engines (Gauthier's and Marek's) is probably due to design differences of the two engines. For example Gauthier's engine had a larger stroke (110 mm compared to 95 mm) which resulted in higher mean piston speeds.

The reason that diesel engines are generally less sensitive than spark ignited is partly due to the fact that Diesel engines run unthrottled. Thus, during the compression stroke, the cylinder pressure versus crank angle trace does not change with load. On a spark ignition engine, the density of the charge drops at lower loads, and so does the compression pressure.

However, the design differences of diesel and spark ignition engines also contribute to the different frictional behavior. Generally, diesel engines have larger piston skirts and wider piston rings. The higher durability requirement of the diesel engines and the lower speed range seem to be the main reason for this difference. Furthermore, the stroke (as well as the stroke to bore ratio) is higher on diesels, which creates a higher mean piston speed. As a result of the above, the hydrodynamic contribution should be higher in diesels (for a given speed). Thus, a reduction of lubricant viscosity at increasing loads can have a significant effect on total frictional losses. In a spark ignited engine the changes in the hydrodynamic portion seem not to be sufficient to significantly impact the total losses and counteract the increase of boundary friction.

By varying certain parameters that directly affect the hydrodynamic portion, Gauthier at al. was able to calculate the boundary contribution at 1250 rpm for different lubricant viscosity for their engine. The approximate boundary contribution on piston friction and total piston friction mean effective pressure (FMEP) for 1250 rpm motored is shown in Graph 3 and 4 respectively. The small increase in FMEP at very low viscosities is due to the very rapid increase of boundary friction. In the viscosity ranges at operating temperatures (less than 10 $mm^2/s$) the boundary contribution ranges between 12 and 25%. At the viscosity of minimum friction (4 to 5 $mm^2/s$) the boundary contribution is over 15%. It can be expected that if this engine was firing and under significant load, the boundary contribution would have been higher. If a rotating liner is applied on this engine with the optimum lubricant viscosity (about 5 $mm^2/s$), it is possible to eliminate that 20% boundary contribution (resulting from metal to metal contact between the compression rings at the dead centers). The rotating liner, apart from the continuation of the fluid lubrication of piston rings at dead centers, will also create extra hydrodynamic pressure on the piston skirt when the large thrust forces are applied by the connecting rod (similar to a journal bearing). Thus, the piston skirt surface area can be reduced without reducing the minimum film thickness between liner and piston and without increasing the chances of metal to metal contact between piston and liner (according to the Stribeck diagram, an increase in the load per unit area can be offset by the increase of the sliding speed keeping the value of the duty parameter unchanged). Thus, the reduction of the hydrodynamic friction of the reciprocating piston motion due to that skirt size reduction will overcome the increase of total friction caused be the relative rotary motion introduced between the piston and liner. Furthermore, the fact that the boundary term will be considerably reduced or eliminated, the FMEP will continue dropping with decreasing oil viscosity beyond the value of 5 mm$^2$/s.

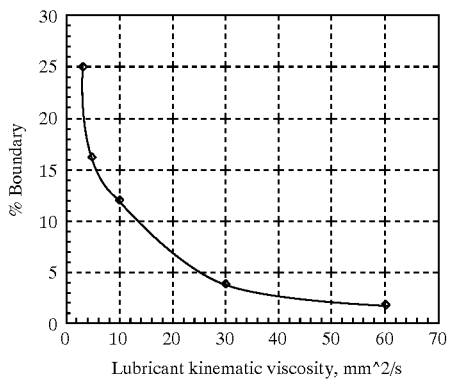

Graph 3. Boundary contribution

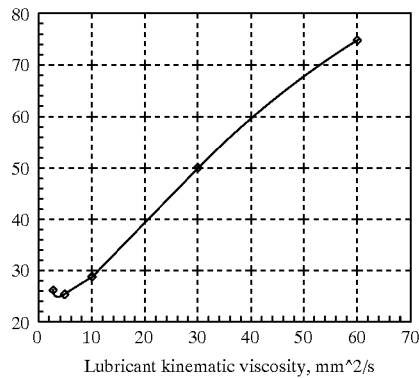

Graph 4. Total friction

The friction of the engine used in Marek's experiment was far more sensitive to load than the one that Gauthier et al. used. Therefore, the boundary contribution in that engine is higher, with higher frictional benefits for the present invention. However, no effort was done to quantify the boundary contribution in that study. Needleman and coworkers expect large boundary contributions in diesel engines as well and suggest that "due to boundary lubrication, 40 to 50% of frictional losses of an engine are attributed to piston/ring assembly with ⅔ of the losses assigned to the top compression ring". In general, the frictional savings with the rotating sleeve concept applied on diesel engines could be higher than in the case of Gauthier's study.

As discussed earlier, due to different design trends and lower durability requirements, the boundary contribution in spark ignition engines can be expected to be higher. Patton et al. have developed empirical equations that estimate the piston assembly boundary and hydrodynamic friction contributions as a function of speed and load. By using the equations proposed by Patton, at 2000 rpm, the boundary contribution on total piston friction on a typical automobile engine can be calculated as high as 50% and approximately 20% at a speed of 6000 rpm at medium load and intermediate values in between.

Spark ignition automotive engines are required to operate over a wide speed range and the ringpack design is a compromise between wear and high speed friction. If the rotating sleeves are driven with some sort of gear mechanism, the optimization of the gear ratio is also a compromise. If the gear ratio between the crankshaft and the sleeves is selected so that the sleeve rotates at a sufficient magnitude for compete elimination of boundary friction at low engine speeds, excessive hydrodynamic friction could result at higher speeds. On the other extreme, if the gear ratio is such that just sufficient sleeve speed is present at high engine speeds, the sleeve speed at low crankshaft speeds will drop proportionally and may not be sufficient for complete elimination of the boundary/mixed friction at top dead center and high load when low viscosity oil is used. However, even in that case (some metal to metal contact occurs at top dead center compression stroke at high load and low engine speed) the portion of the stroke that this happens is confined to a much smaller part of the stroke around the dead center in respect to a conventional engine because the sliding speed of the compression ring is always held at well above the zero value. Since at these parts of the stroke the piston speed is very low, the piston energy losses due to boundary friction will still be far less than the in a conventional engine. Furthermore, due to the very large contribution of boundary/mixed friction at low speeds in conventional spark ignition engines, the frictional benefits could be very significant (especially at higher loads). At higher speeds when the piston and sleeve are moving faster, complete boundary elimination seems more likely but with a smaller potential for friction reduction.

In spite of the possible presence of some metal to metal contact at low speeds, some useful wear reduction can be possible in engines with a large speed range variation. Ohmori and coworkers (1993) showed that at 6000 rpm the instantaneous ring wear could be an order of magnitude higher than at 2000 rpm. Thus, even if some boundary friction still exists at low speed, the resultant wear will not be so significant. The more significant wear rate normally present at higher engine speeds can be eliminated.

Friction Calculations

The following calculations apply to a spark ignition automotive engine. The friction model developed by Patton et al. was used. The driving mechanism considered was the one of alternating sleeve speed (high magnitude when piston close to a dead center, low when at mid stroke, no reversal of direction considered, see embodiments). Note that in a 4 cylinder engine where all pistons reach a dead center at the same time, only one alternating speed mechanism needs to be fabricated. Gears interconnecting adjacent sleeves can duplicate the motion for the other 3. No reduction on piston skirt size was considered.

For the calculations, it was assumed that the driving mechanism was designed so that the sliding velocity between the piston ring and the sleeve is approximately constant in magnitude and at the value of the peak piston speed of a conventional engine with similar dimensions. This is a conservative figure, since the required speed for fully hydrodynamic lubrication is less, especially at higher engine speeds. Thus, at higher engine speeds, the friction mean effective pressure could be expected high due to the high velocities of the additional moving parts.

Two engines were modeled: one conventional and one designed according to the above recommendations. For both engines the following dimensions were used: Bore=85 mm, Stroke=75 mm, Compression Ratio=10:1, Cylinder Displacement=426 cc, Connecting rod Length=118 mm. A relatively small engine was chosen because this model was derived for small passenger car engines.

In this model, the reciprocating friction was divided into three terms. The first term was the hydrodynamic component mostly from the piston skirt and the connecting rod bearing. The second term was the mixed lubrication term mostly due to ring static tension and therefore is independent of engine load. Finally, the third was the mixed lubrication of the compression rings due to gas loading and was directly proportional to manifold pressure.

In the rotating sleeve case, the two mixed lubrication terms were not included since hydrodynamic lubrication is assumed. The fact that the piston ring lubrication is now hydrodynamic will be accounted by the increase of the hydrodynamic term considered bellow. Furthermore, since the friction in the hydrodynamic lubrication is not as strong a function of the normal force as of sliding speed, the fmep (friction mean effective pressure) on the new design was assumed independent of gas loading and therefore intake manifold pressure.

However, the hydrodynamic term should be higher in the new design in order to account for the extra friction due to sleeve rotation. The hydrodynamic friction term between the rotating sleeve and the piston should be included. Even though this force is indirectly increasing the friction (through the sleeve driving mechanism), for computational purposes, it was assumed directly acting. The overall increased friction was estimated as follows. The hydrodynamic term for the conventional engine was considered as the mean value of an alternating sinusoidal friction of a certain amplitude A.

$$fmep = \frac{\int_0^\pi A \cdot \sin\varphi \, d\varphi}{\pi} \text{ where } \varphi \text{ is crank angle}$$

By solving the integral, the peak value A was calculated as $$A = \pi * fmep/2$$

Then, the hydrodynamic fmep for the new engine was assumed equal to that peak value since the sliding speed remained always high. The fact that the hydrodynamic term in the engine model included the connecting rod friction as well, made the estimation even more conservative. The fact that at peak piston speed the sleeve still had to slightly rotate should not affect the friction significantly, since the two velocities were normal to each other. Even if the sleeve surface minimum linear speed is 20% of the piston speed at that instant, the resultant vector is less than 2% increased in magnitude. Note that Patton's model includes the ring hydrodynamic portion in these terms. Thus, the overall increase of these terms does take under consideration the increase in the viscous ring friction.

The friction due to the two journal bearings that support the sleeve on the block was also included. A finite element analysis code for journal bearing performance prediction was used. The bearings had to be designed in order to take the side loads transferred from the connecting rod during the power stroke. The two following load criteria derived from the UT Fractal Engine Model had to,be met by the bearings. 50 Atm peak pressure at 20 degrees after top dead center at 1000 rpm and 100 Atm peak pressure (highly exaggerated value to account for a safety factor) at the same crank angle at 3000 rpm. After the design was completed, the sleeve bearings were assumed to rotate at 54% of engine speed for the fmep contribution. This was estimated from the fact that the peak sleeve linear speed should match the peak piston speed. This corresponds to an angular speed equal to the engine speed times stroke to bore ratio. The minimum speed should be 20% of the maximum in order to minimize losses. Finally, the mean would be roughly the average of the two.

The losses from the driving mechanisms were not included. However, gears or chains can be designed to operate at relatively high efficiencies and therefore were not expected to alter the results by much. Graph 4 shows the results obtained.

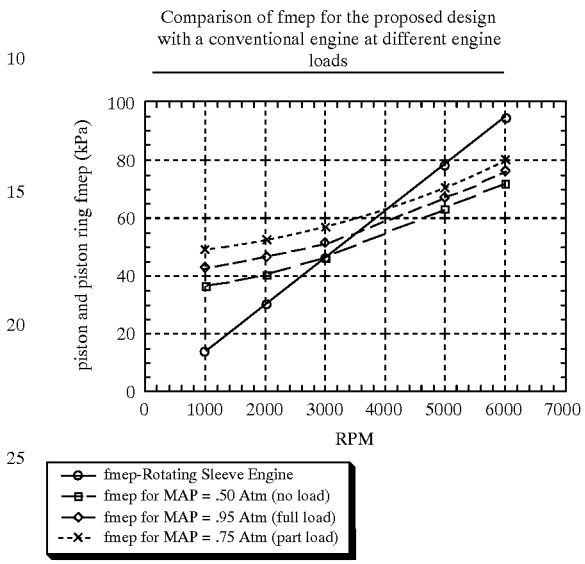

Graph 5. Piston assembly friction comparison of the proposed design with a conventional engine, high sleeve speed.

Note that for speeds bellow 3600 rpm and medium load, the new design demonstrates lower fmep. The break even point is raised to 4200 rpm for full load. At engine speeds that most vehicles cruise, the fmep reduction is evident.

If the engine is required to operate at higher engine speeds for long periods of time, the sleeves could be geared lower in order to reduce the fmep at these speeds. The trade off could possibly be slightly higher friction and some wear at lower engine speeds as compared to the high sleeve speed scenario, due to the possibility of not having enough sliding speed for a fully hydrodynamic film. The previous assumption that the sleeve speed at TDC needed to be equal to the maximum piston speed in order to retain the fluid lubrication on the compression rings at dead centers is excessive even for medium speeds. Drawings of the sleeve valve test engine used on Ricardo's experiments show that the sleeve linear speed was only a fraction of the peak piston speed and during those tests the engine speed did not exceed 2000 rpm (however, the ring pack used in that engine was of different design compared to modem automotive engines, and the lubricant viscosity was probably high compared to modern energy saving multigrade oils). Furthermore, the numerical solutions of the Reynold's equation discussed earlier indicate that with a conventional ring profile and an SAE20W oil, a sleeve surface speed of 3m/s can create film thickness of well over 0.5 microns at TDC with the typical peak cylinder pressures of spark ignition engnes. With the revised ring profile (FIG. 8), even lower sleeve speeds will suffice. The average sleeve speed is assumed half of the first case, and therefore the increase in the hydrodynamic piston friction is also half. The reason is that since the sleeves are driven by gear mechanisms, the peak sleeve speed is proportional to crankshaft speed. Therefore, the sleeve surface speed at very low rpm and high load may be insufficient for complete asperity contact. Also, the model used to generate the rotating sleeve engine friction ignores mixed lubrication, and thus this potential small increase caused by mixed lubrication does not show in the graph. However, as discussed in a previous section, the low sleeve speed rotating sleeve engine is still expected to show lower friction than conventional engines, even at this operating condition.

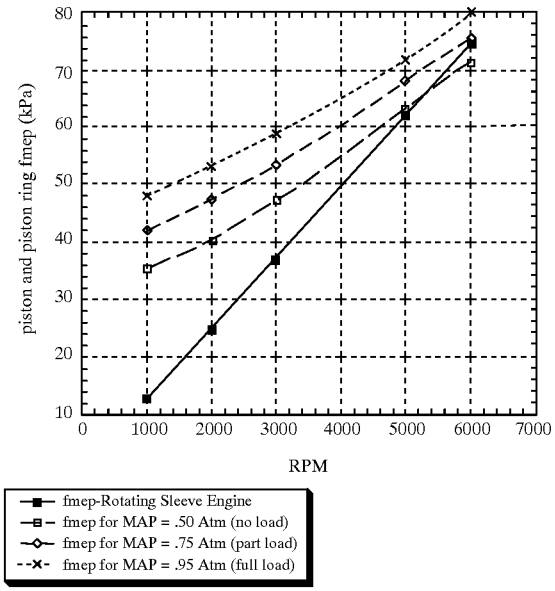

Comparison of fmep for a rotating sleeve engine with reduced sleeve speed with a conventional engine.

- ■ fmep-Rotating Sleeve Engine
- ▫ fmep for MAP = .50 Atm (no load)
- ◇ fmep for MAP = .75 Atm (part load)
- × fmep for MAP = .95 Atm (full load)

Graph 6. Piston assembly friction comparison of the proposed design with a conventional engine, low sleeve speed. Note that in the above graph, the fmep for the new design could be underestimated at low engine speeds.

For engines that operate at fairly narrow rpm range, the sleeve speed could be optimized for wear and friction.

Additional Efficiency Benefits

The rotating sleeve concept can further improve overall engine efficiency indirectly with mechanisms that are not as obvious.

According to Gardner at al. the optimum compression ratio on Direct Injection (DI) diesels is limited by the reduction of mechanical efficiency at high values of compression ratio, mostly due to piston ring friction. In that study, it was shown that the indicated thermal efficiency (engine efficiency disregarding frictional losses) was increasing with increasing compression ratio throughout the range of 13 to 22 to 1 that was tried. However, the friction of the piston rings was also increasing with increasing compression ratio. This effect limited the optimum compression ratio (for best brake thermal efficiency) to a value of 15:1. With the application of the rotating sleeve concept, a severe reduction of piston ring friction will be achieved, and thus, the optimum compression can be higher, achieving even higher thermal efficiency. The higher compression ratio will also help cold starting performance that is usually a problem with diesel engines. According to the same study, satisfactory cold start performance is normally achieved with compression ratios higher than the optimum value for best efficiency.

In conventional engines, the stress on the block caused by the cylinder head bolts as well as thermal stresses, cause liner distortions. According to Lawrence (1990) those distortions can alter the perfectly circular shape of the cross section of the cylinder achieved by the machining process. These distortions cause increased blow-by and oil consumption. Note that this distortion is more pronounced in the upper part of the liner that corresponds to piston locations where the gas pressure and thus the potential for blow by is the highest. In the proposed design, the liner will not be loaded from the cylinder head bolts and thus, free of mechanical distortions. The continuous rotation will eliminate or reduce any temperature gradients around the liner. The perfectly circular liner cross section will result in a more effective gas sealing, and thus reduction of blow-by and oil consumption. Any reduction of blow-by can be considered as direct efficiency benefit.

Conclusion

It has been demonstrated that the new design can provide useful friction reductions and piston ring and liner wear elimination or severe reduction for a variety of engines. More efficient engines of virtually infinite life can be produced. Rotating sleeve engines could be designed in such a way that valve train components (that will still wear with the existing rate) can be rapidly replaced without requiring a complete disassembly. Thus, the engine overhaul cost can be significantly reduced.

Best results are expected on engines that operate at relatively low speed ranges. Then, the motion of the sleeve can be tailored for one speed without excessive hydrodynamic losses (due to excessive sleeve speeds) or boundary friction (due to too low sleeve speeds). However, the durability and frictional reduction requirement could make certain applications more feasible than others. Engines can be designed to operate at high brake mean effective pressures and engine speeds, and thus more power per engine weight without sacrifices in their durability. Modern diesel engine emission requirements demand the use of excessive exhaust gas recirculation that can increase corrosive wear on rings and liners (Needleman and Mandhavan, 1988) increasing the need for anti-corrosion additives. The fluid lubrication will create an immunity of the cylinder wear in the chemical composition of the lubricant. Additives that were specifically formulated for piston ring lubrication may not be necessary on rotating sleeve engines. Thus, the products of the combustion of the lubricant (that happens to some degree in all engines) may not be as toxic as they have to be for conventional engines.

REFERENCE LIST

The following scientific literature was used for the research study shown above:

Ricardo, H., R. and J. G. Hempson *The High Speed Internal Combustion Engine* Fifth Edition, Blackie & Son Limited 1968

Setright, L. J. K. *Some Unusual Engines* Mechanical Engineering Publications Ltd 1975

Hamrock J. B. *Fundamentals of Fluid Film Lubrication* McGraw-Hill, Inc.

Lawrence J. B. *Effect of cylinder distirtions and piston ring design on oil consumption and friction losses in automobile engines* DE-AC02-90236

Ball,. W. F., N. S. Jackson, A. D. Pilley, and B. C. Porter *The friction of a 1.6 liter automotive engine— gasoline and diesel* SAE Paper 860418

Gauthier A., and B. Constans *Lubricant effects on piston/ rings/liner friction in an instrumented single cylinder Diesel Engine* SAE Paper 872034

Takiguchi M., H. Kituchi, and S. Furuhama *Influence of clearance between piston and cylinder on piston friction* SAE Paper 881621

Needleman W. M., and P. V. Mandhavan. *Review of lubricant contamination and diesel engine wear* SAE Paper 881827

Ku Y. G., and D. J. Patterson *Piston and ring friction by the fixed sleeve method* SAE Paper 880571

Patton, K. J., R. J. Nischke, J. B Honeywood *Develpment and evaluation ofa friction model for spark ignition engines* SAE Paper 890836

Mitsumoto S., T. Miyamoto, and H. Yamamoto *Effect of Lubricant viscocity, additives and ash content on durability in a heavy duty diesel engine* SAE Paper 892050

Yoshida, H. K. Kusama, and J. Sagawa *Effects of surface treatments on piston ring friction force and wear* SAE Paper 900589

Marek L. S., W. Bryzik, and N. A. Heuein *Effect of load and other parameters on instanteneous frictional torque in reciprocating engines* SAE Paper 910752

Ohmori T., M. Toyama, and M. Yamamoto *Influence of oil viscocity on piston ring and cam face wear* SAE Paper 932782

Ting L. L *Development of a reciprocating test rig for tribological studies of oiston engine moving components—Part I* SAE Paper 930685

Gardner T. P., Henein N. A. *Compression Ratio Optimization in a Direct Injection Diesel Engine—A Mathematical Model* SAE Paper 880427

Tian T, V. W. Wing, J. B. Heywood *A piston ring-pack film thickness and friction model for multigrade oils and rough surfaces* SAE Paper 962032

SUMMARY OF INVENTION

The invention is directed to an internal combustion engine having one rotating sleeve per cylinder that is supported by two journal bearings. The objective of the rotation is to maintain the sliding motion between the piston rings and liner in order to maintain the hydrodynamic lubrication regime throughout the stroke. The rings will be held stationary by the friction between the piston grooves and rings. However, if necessary, the rings can be pinned on the piston to prevent their rotation. Unlike the typical sleeve valve engine, the surface area where tight tolerances between the sleeve and the block exist are confined to the minimum necessary for reliable hydrodynamnic support of the sleeve, minimizing the friction due to liner rotation. The intake of the fresh charge (or fresh air in the case of a Diesel) and exhaust of the combustion products are accomplished via conventional popper valve arrangement. A flange on the upper part of the liner transfers the thrust loads to the cylinder head and the block. Furthermore, the flange reinforces the upper part of the sleeve preventing or minimizing the sleeve expansion due to high cylinder pressure that occurs when the piston is in proximity to top dead center (TDC) which could otherwise take up the clearance of the upper journal bearing. This has been reported by Ricardo to be a typical phenomenon in sleeve valve engines without a flange, causing a serious penalty in friction and wear between the sleeve and the block. A set of pressure activated sealing devices are installed on the upper part of the sleeve to prevent high pressure combustion gases from entering the space between the liner and the block. The journal bearings that support the sleeve are supplied with pressurized oil from the oil pump lubricating the bearings. Lubricant leakage from these journal bearings fills up the space between the liner and the block and also lubricates the sealing devices on the upper part of the sleeve and the flange which acts as thrust bearing. The excess lubricant is removed by oil return passages and by direct leakage back to the oil pan. The oil that surrounds the liner will remove excess heat from the engine, and may be used as the sole coolant fluid of the engine. In fact, the motion of the liner will enhance heat transfer from the liner to the oil.

The sleeves are driven by the crankshaft via gear mechanisms. Since the motion of the sleeve is not related to port operation unlike typical sleeve valve engines, the motion of the liners is independent of valve timing. Thus the final gear ratio between the crank and the sleeves can be optimized for friction optimization and wear minimization. For example, a turbocharged diesel engine with high peak cylinder pressure and low operating speeds will have such a gearing that the sleeve speed will be high for a given crankshaft speed in order to ensure full hydrodynamic lubrication of the piston rings at TDC compression stroke. On the other hand, an engine with high operating speeds and lower peak cylinder pressure like a spark ignition engine needs lower sleeve speed for a given crank speed to ensure hydrodynamic lubrication, and excessive sleeve speed would only result in excessive hydrodynamic losses. Furthermore, in applications where frictional losses are more important than wear of piston rings and liner, the sleeve speed can be less than the minimum necessary for full hydrodynamic lubrication at dead center compression stroke. In that case, some metal to metal contact may be likely at certain operating conditions (full load) but the overall losses due to sleeve rotation will be still kept low. Still, the metal to metal contact between the top compression ring and the liner will be confined on the small part of stroke when piston speed is very close to zero. The overall transmission ratio between the crank and sleeve can be adjusted by changing the gear ratio of the relevant gears.

The sleeve speed can be constant (for simplicity) or with alternating value (without reversal) for friction optimization. In the latter embodiment, the objective of alternating the value of the sleeve rotation is that at the mid portion of the stroke, the piston speed is sufficient for hydrodynamic lubrication regardless of liner rotation. Therefore, liner rotation at that part of the cycle does not offer any significant frictional benefits as at around the dead centers. Thus, minimizing the rate of rotation will reduce the additional friction caused by the liner rotation. However, even at mid stroke, a minimum rotational speed of the sleeve will have to be retained (even when the piston is at its peak speed) in order to retain the hydrodynamic oil film in the journal bearings with some small expense in friction. Then, as the pistons slow down, the driving mechanisms will gradually accelerate the sleeves. When the pistons come to a fall stop, the sleeves will be at their peak speed. Then as the pistons speed up again, the sleeves could gradually slow down at their minimum speed when the pistons are at their maximum. An eccentric driving mechanism or a geartain based on the "Geneva Wheel" achieves this motion. The kinetic energy stored in the sleeves at peak angular speed will return to the system during deceleration. In a multi-cylinder engine, the sleeves could be driven by independent mechanisms. However, gears installed on the outside of the sleeve surface (either the top or the bottom) could mesh with the sleeves of neighboring cylinders eliminating the need for individual driving mechanisms. The above driving method is particularly attractive if the constant sleeve speed embodiment is chosen, or if the alternating sleeve speed is to be used on a four cylinder engine (or in any in-line engine with a flat crankshaft design) where all pistons reach a dead center at the same time. In the latter case, the alternating magnitude rotation needs to be created by one mechanism and the motion will be duplicated from liner to liner.

Graph 7 shows the optimum liner speeds for different engine applications as derived from the numerical solution of the Reynold's equation. Again, the lubricant viscosity assumed is for an SAE 20 oil, a low viscosity lubricant that has the potential of minimizing the hydrodynamic losses at mid-stroke. The minimum film thickness is 0.8 microns which corresponds to a relatively small thickness but lies within the limits of hydrodynamic lubrication (based on the relevant literature). However, if the film thickness drops bellow that value, metal to metal contact is eminent. The average lubricant pressure shown in Graph 7 indicates the maximum cylinder pressure that can exist at TDC compression/expansion stroke, without any reduction in the film thickness. Note that the pressure at TDC compression/expansion stroke is very close to the peak cylinder pressure that typically occurs between 10 and 20 crank angle degrees after TDC. The two lines shown in Graph 7 show a typical (lower) and the revised compression ring profile (upper curve).

The gear selection for the sleeves is done as follows. The most frequent operating engine speed and load are selected. The corresponding peak cylinder pressure needs to be determined. Then, referring to Graph 7 depending on which compression ring profile is selected, the sleeve needs to rotate with an angular velocity such that the inner liner surface and peak pressure are at a point on the corresponding line or just bellow it. The equation that relates the liner surface speed with the liner rotational speed is: $V=\Omega*R$ where V is velocity (m/s), R is bore radius (m) and $\Omega$ is sleeve angular velocity (rad/s). Then, simple arithmetic will determine the overall ratio of teeth of the driving gears. This applies for both constant and alternating speed. For the latter case, the maximum liner speed needs to be properly selected and is the one that is relevant to Graph 7. For example, a spark ignition engine with most frequent operating speed of 3000 rpm, a peak cylinder pressure of 35 atm, and a conventional ring profile, requires a sleeve angular velocity such that the inner liner surface speed is at 4 m/s. If the speed is less than that, the minimum film thickness will drop bellow 0.8 microns at TDC, full load, and some metal to metal contact and wear could occur at TDC. For a turbocharged diesel engine with most frequent operating speed of 1200 rpm, a peak cylinder pressure of 95 atm, and a revised compression ring profile, about 3.5 m/s or less is required. Note that the revised compression ring is recommended, since the liner rotation requirements is minimized with reduced sleeve friction. In that particular example, at engine speeds of higher than 1200 rpm, the sleeve speed will increase proportionally since it is driven by gear mechanisms by the crankshaft, ensuring fluid film lubrication of the ring. At lower speeds, if the peak cylinder pressure at full load remains approximately similar, some boundary friction is likely. Thus, if wear elimination is of paramount importance for the application, higher sleeve speed may have to be selected with an expense in high speed hydrodynamic losses. However, in typical heavy duty engines, the turbocharger speed drops at lower engine speeds due to reduced exhaust flowrate (lower turbocharger speed), resulting in lower peak cylinder pressure.

Also note that prior ported engines with a conventional ring profile and with a peak pressure/sleeve speed point that falls above the dotted line of Graph 7, the film thickness at TDC would drop bellow 0.8 microns with metal to metal contact, increased piston and sleeve friction and wear being very likely. However, if a lubricant with higher viscosity was used, the metal to metal contact could have been minimized or avoided, with an expense in the hydrodynamic friction of the piston at mid-stroke and in sleeve friction. In the case of the sleeve valve engines described by Ricardo, the typical compression ratio of those engines was around 6:1 due to detonation limitations, resulting to far lower peak pressure as compared to a modern heavy duty diesel engine with compression ratio of around 14 to 17:1. Also, the modern multi weight moror oils were not available at the time.

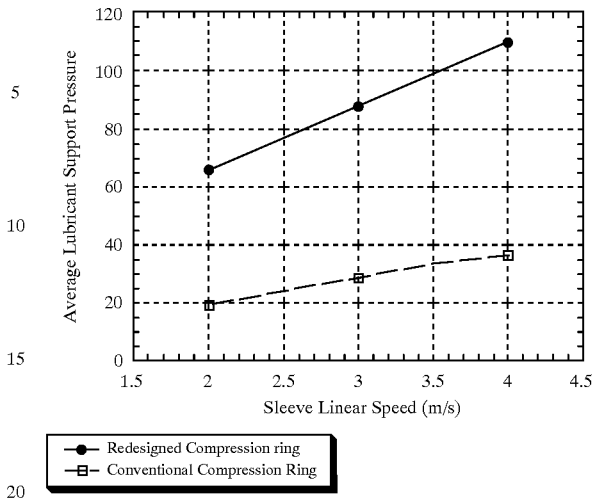

Graph 7. Average lubricant film support pressure (atm) @TDC for different liner speeds and compression ring profiles.

BRIEF DESCRIPTION OF DRAWINGS

FIG. 6A shows a conventional ring profile. The drawing is exaggerated for clarity. Note that profile is curved rather than angular as shown in the figure.

FIG. 6B shows the new ring piston profile for the rotating sleeve engine. Again, the drawing is exaggerated for clarity and profile is curved rather than angular as shown in the figure.

FIG. 8 shows a top view and two cross sections of a section of the new piston ring profile.

FIG. 9 shows sections the conical seal from three different views.

DESCRIPTION OF PREFERRED EMBODIMENTS

Figure 1:
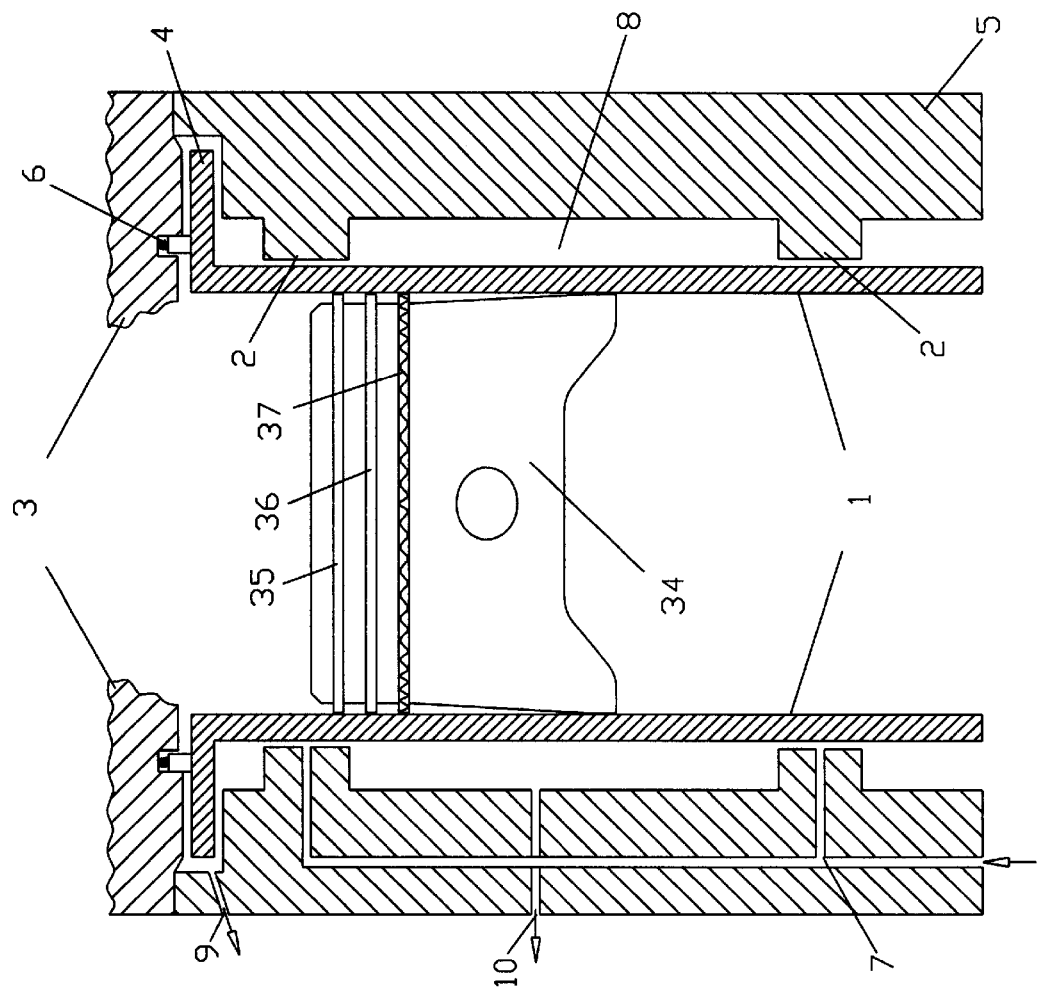
FIG. 1 shows the general side view of the cylinder of the rotating sleeve engine. Note that clearances have been exaggerated for clarity.
Figure 2:
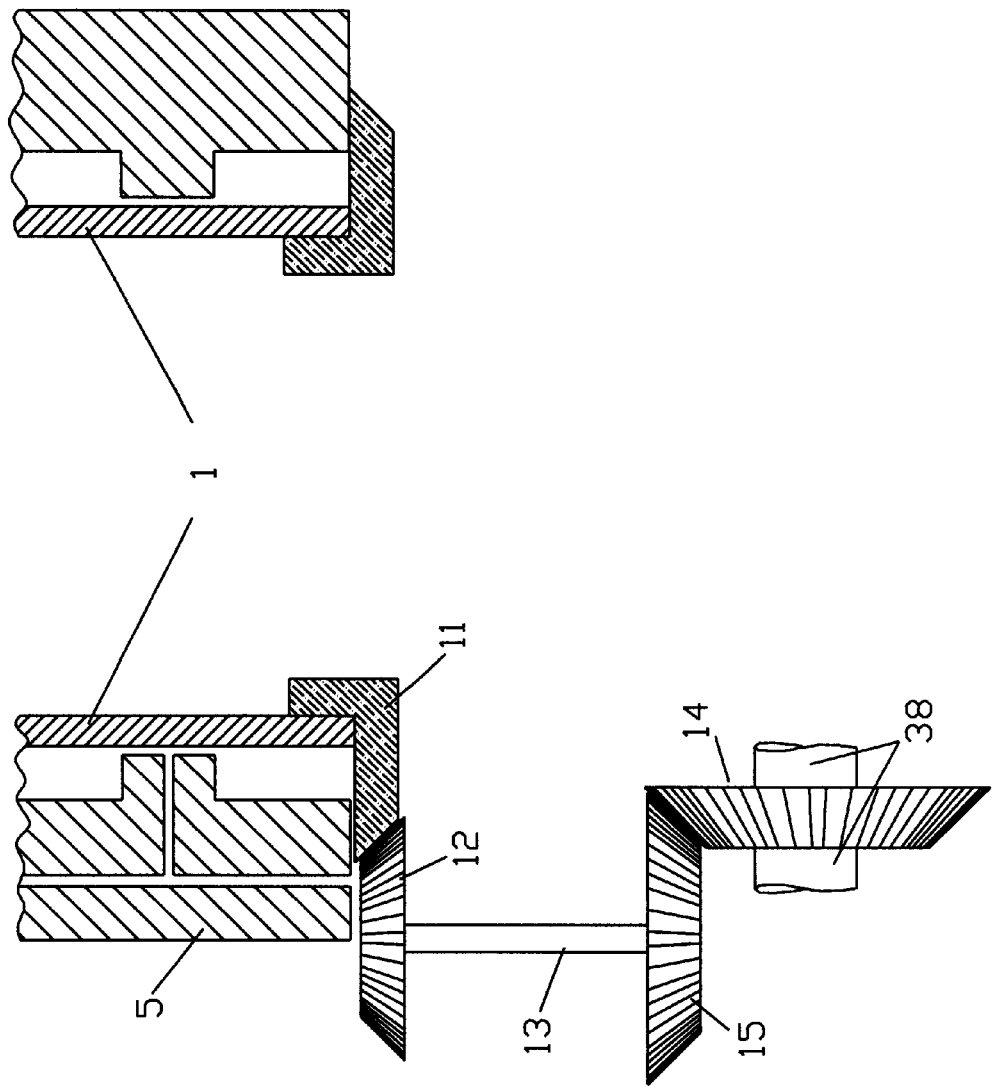
FIG. 2 shows a detail of the sleeve driving mechanism

Referring to FIG. 1 (clearances have been exaggerated for clarity), there is shown one of the cylinders of a four stroke internal combustion engine with a rotating sleeve 1 that is supported by two journal bearings 2. The intake of the fresh charge (or fresh air in the case of a Diesel) and exhaust of the combustion products are accomplished via conventional poppet valve arrangement (not shown) which are located in the cylinder head 3. Thus, unlike typical sleeve valve engines, the motion of the liners is independent of valve timing and can be optimized for friction and wear minimization. A flange 4 on the upper part of the liner transfers the thrust loads to the cylinder head 3 and the block 5. Furthermore, the flange reinforces the upper part of the sleeve preventing or minimizing the sleeve expansion due to high cylinder pressure that occur when the piston is in proximity to TDC. A piston 34 is fitted within the rotating sleeve and is connected via a connecting rod (not shown) to the crankshaft (not shown). The piston 34 is equipped with a compression ring 35 pinned on the piston to prevent its rotation, scraper ring 36, also pinned on the piston, and oil control ring 37. A set of pressure activated sealing devices 6 are installed on the upper part of the sleeve to prevent high pressure combustion gases from entering the space between the liner and the block. In FIG. 1, one pressure activated seal 6 is shown. This is a compression ring with spring load against the outside of its groove machined into the head 3 and also spring load against the flange 4. The journal bearings 2 and 3 that support the sleeve are supplied with pressurized oil from the oil pump lubricating the bearings via oil passage 7 that is machined in the block. The clearance for these bearings is within the range for typical journal bearings of about 0.002 to 0.004 inches. The diameter to length ratio for the journal bearings is at typical values between 3 and 4. The upper bearing is located as high as possible, close to the flange. The location of the second bearing is not so strictly defined, but its centerline is at a level well bellow the middle of the piston stroke. Lubricant leakage from these journal bearings fills up the space between the liner and the block 8 and also lubricates the sealing device 6 and the flange 4 which acts as thrust bearing. The oil that surrounds the liner the space 8 will remove part of the excess heat from the engine. In fact, the motion of the liner will enhance heat transfer from the liner to the oil. The flange 4 can be provided with pads as on hydrodynamic thrust bearings in order to promote hydrodynamic lubrication pressures. The excess lubricant is removed by oil return passages 9 and 10 and by direct leakage back to the oil pan. Referring to FIG. 2, the sleeve 1 is equipped with a gear 11 that engages gear 12 which is connected to shaft 13. Shaft 13 is driven by gear 15 attached to the shaft 13. Gear 15 engages gear 14 which is part of the crankshaft 38 (shown only partially). As explained in previous sections, the final gear transmission ratio between the crank gear 14 and the sleeve 1 is very important for friction and wear consideration and can be optimized for different applications. This can be accomplished by changing the ratio of teeth gears 14, 15, 12 and 11.

Alternative Embodiment: Unpinned Compression Ring

In the present alternative embodiment, the ring is not pinned in its piston groove. However, when the high cylinder pressure take place during compression, the friction between the lower piston groove will prevail preventing the ring's rotation. The benefit of this is the rotation of the rings at other parts of the stroke will maintain the groove clean and free of combustion deposits.

Alternative Embodiment: Alternating Sleeve Speed

Figure 3:
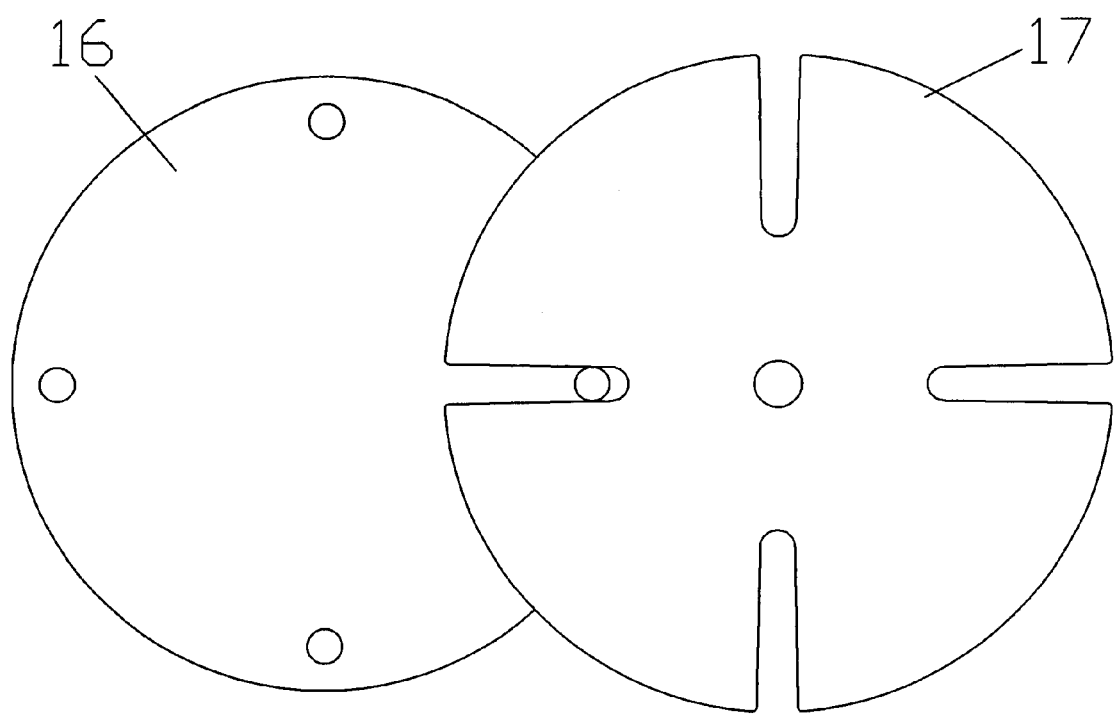
FIG. 3 shows the means of alternating the magnitude of the sleeve speed.

The liner motion can be continuous (constant angular speed for a given crankshaft speed) for simplicity or with alternating value for this alternative embodiment. In the second case (alternative embodiment), a mechanism alternates the magnitude (but not the direction) of the liner angular velocity to a higher magnitude at the portion of the cycle when the piston is in proximity to a dead center. However, when the piston is around the mid portion of the stroke where hydrodynamic lubrication would exist anyway, the liner slows down for frictional savings. This is achieved preferably by using the Geneva wheel concept. The shaft 13 of FIG. 2 is broken up in two parts as shown in FIG. 3. Wheel 16 is connected to the part of the shaft that is connected to the crankshaft, and rotates at constant speed for a given crankshaft speed. Also, wheel 16 is equipped with four pivots that engage the slots of wheel 17 that is connected to the part of the shaft that drives the gear 12 and thus the sleeve. Simple kinematics can show that the resulting speed of wheel 17 is alternating between a high value (pivot of wheel 16 is at its closest to the center of wheel 17) and a low value (pivot of wheel 16 is at its farthest location from the center of wheel 17). The number of teeth between gears 14 and 15 need to have a ratio of 1:2 in order to have the speed alternation in phase with piston motion. However, the ratio of teeth between gears 11 and 12 can be still altered arbitrarily in order to achieve any peak sleeve speed required at a given crankshaft speed. In the alternating sleeve speed embodiment, the sleeve thickness needs to be A the minimum possible in order to reduce the inertia loads on the driving mechanism. If carbon steel is to be used for the sleeve material, for SI and diesel engines, this thickness should be around 1/16 and 3/16 of an inch respectively. Note that when the typical peak pressures for each type of engine is applied to a sleeve of infinite length with the corresponding thickness, the elastic deformation is of the same order as a typical journal bearing clearance. However, the flange at the top of the sleeve will minimize that deformation to a much lower number. When the area of the sleeve that is surrounded by the lower journal bearing is exposed to cylinder gas pressure, the pressure is dissipated due to gas expansion to very low value.

Alternative Embodiment: Driving Mechanism for Multi-Cylinder Engines

Figure 4:
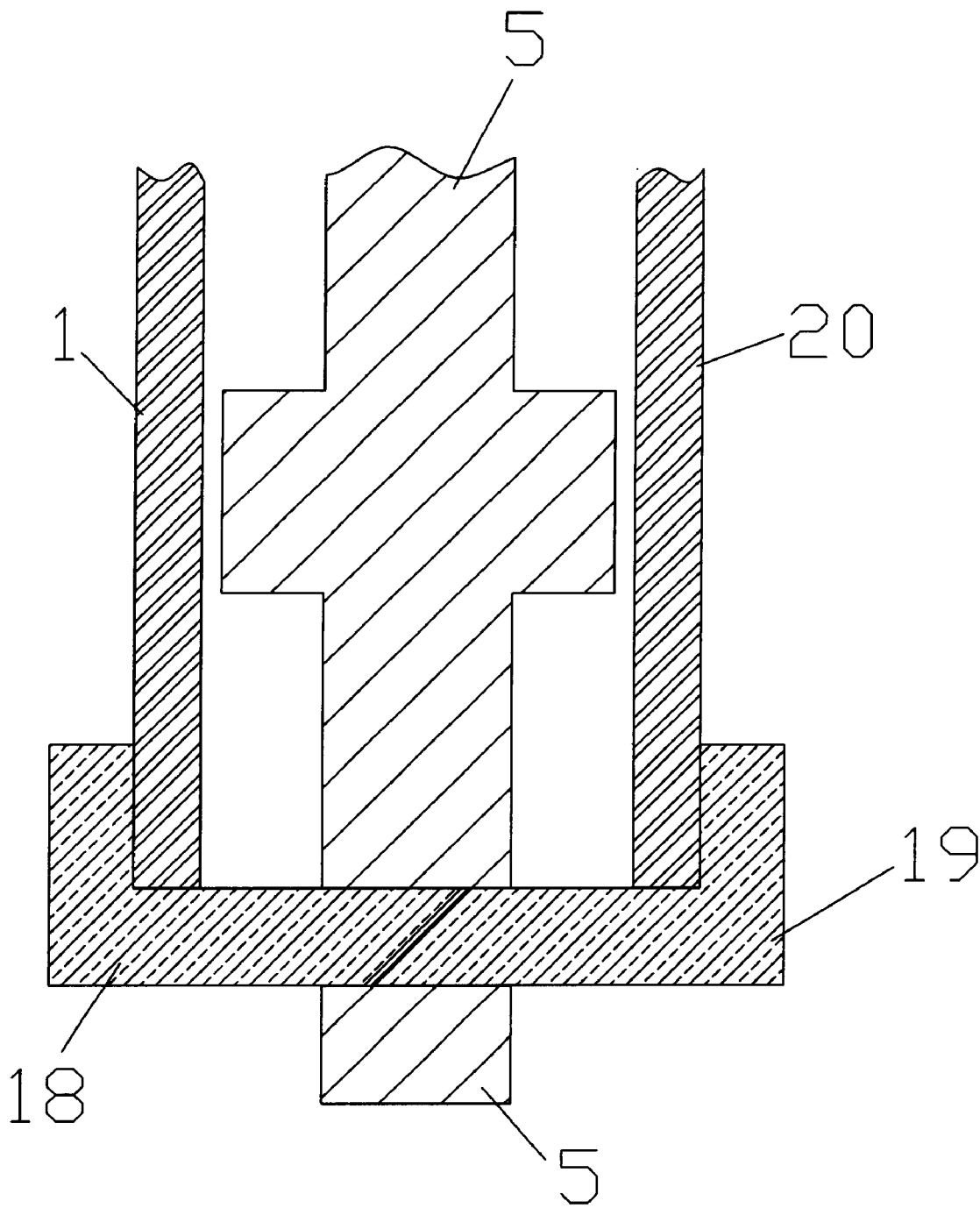
FIG. 4 shows the way adjacent sleeve gears engage each other.
Figure 7:
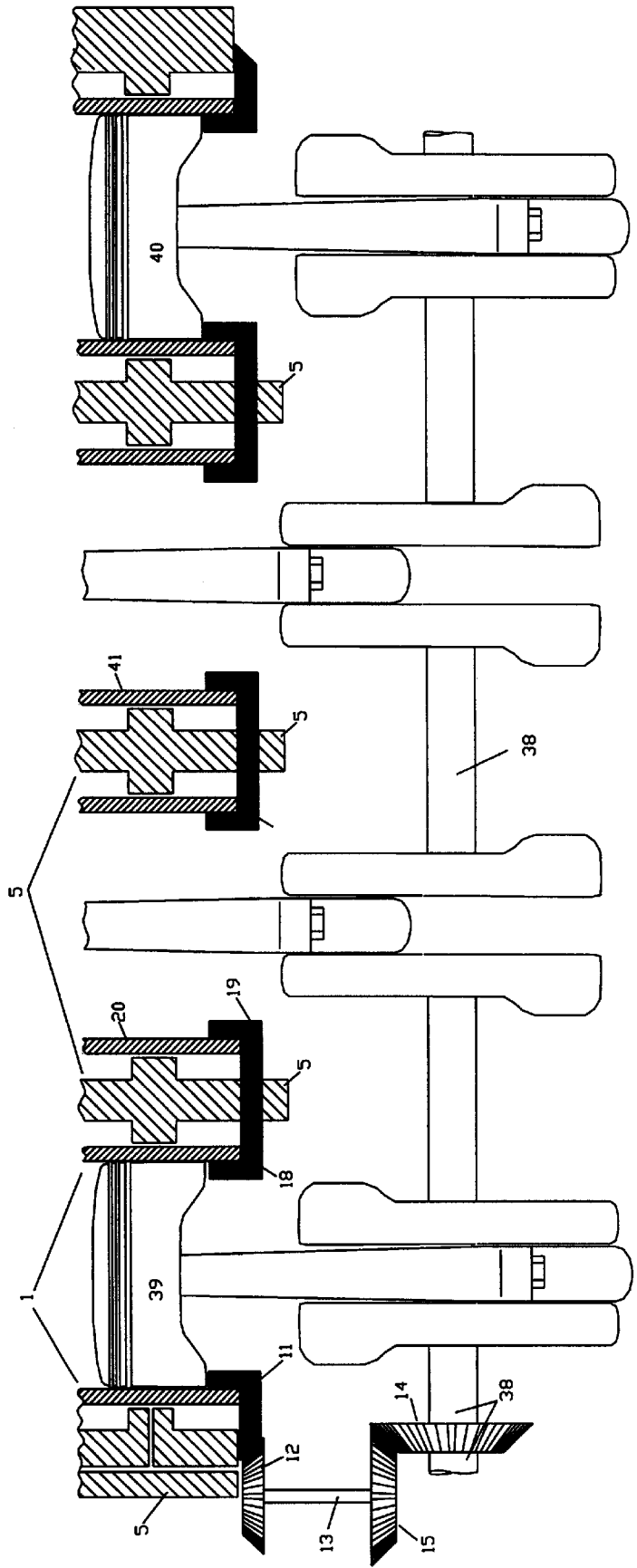
FIG. 7 shows the sleeve driving mechanism for a 4 cylinder rotating sleeve engine.

In an alternative embodiment of the invention applied in a multi cylinder engine, gears are installed on the outside of the sleeve surface as shown in FIGS. 4 and 7 and mesh with the sleeves of neighboring cylinders eliminating the need for individual driving mechanisms. Gear 18 (which is identical to gear 11 as shown in FIG. 2) is bolted or press fitted on rotating sleeve 1, while a similar gear 19 is attached to the neighboring sleeve 20. The two gears are meshed through a slot machined on the block 5. FIG. 7 shows this embodiment as applied to a 4 cylinder engine. Crankshaft 38, supported by main bearings (not shown), is equipped at the left end with gear 14 that transfers mechanical energy to the gear 11 of sleeve 1 of cylinder #1 (#1 refers to the unit to the far left of the Figure) via shaft 13. Gear 19 is attached to sleeve 20 of cylinder #2 and meshes with gear 18 (which is the same part as 1). The sleeve 20 of cylinder #2 similarly engages the gear of sleeve 41 of cylinder #3, etc. The above driving method is particularly attractive, if the constant sleeve speed embodiment is chosen, or if the alternating sleeve speed is to be used on a four cylinder engine (or in any in-line engine with a flat crankshaft design) where all pistons reach a dead center at the same time. With this design, only one driving mechanism transferring mechanical energy from the crank to the sleeves needs to be installed, and the sleeve motion propagates to all cylinders. FIG. 7 illustrates a typical 4 cylinder engine crankshaft of the "flat" design which means that all the connecting rod bearing centers are on one plane. As a result, all cylinders reach a dead center simultaneously. Pistons 39 and 40 of cylinders 1 and 4 respectively are shown at the bottom dead center (BDC) position while the pistons (not shown) of cylinder #2 and #3 are at TDC. Note that the instant shown in FIG. 7 is the part in the engine cycle where the maximum sleeve speed is reached if the alternating speed embodiment is applied.

Alternative Embodiment: Conical Sealing Device

Figure 5:
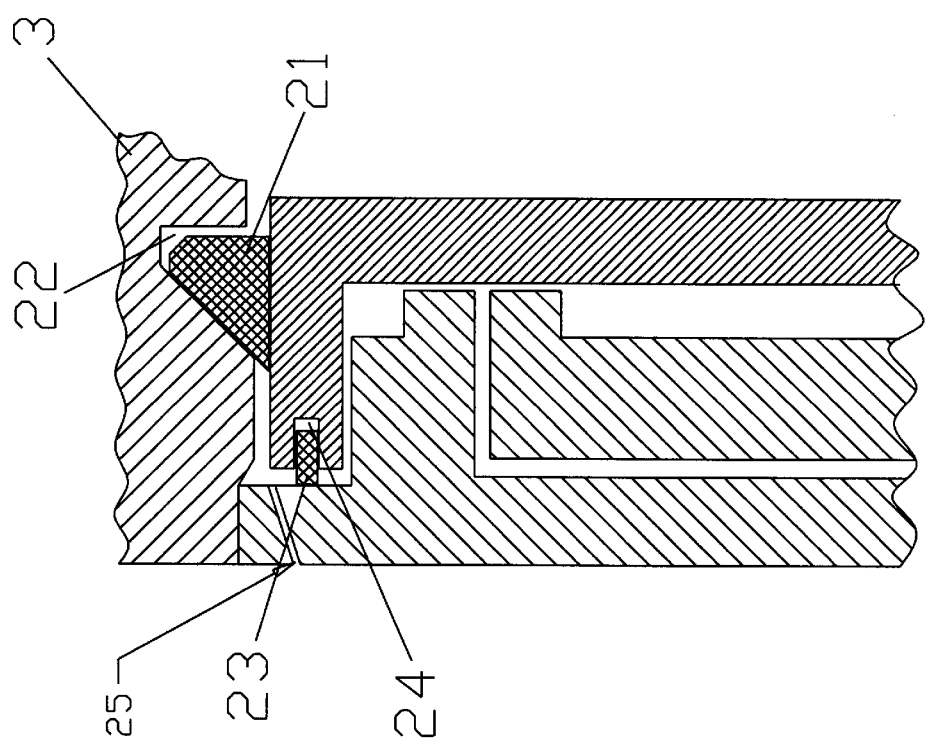
FIG. 5 shows the sleeve/cylinder head sealing mechanism

In an alternative embodiment, a conical pressure activated sealing device has been conceived. Referring to FIG. 5, a conical ring 21 fits on an also conical groove 22 machined on the cylinder head 3. Just like typical compression rings, that seal also has an open end and the diameter when uncompressed is a little larger than the groove it is supposed to fit in. Therefore, when forced into groove 22, the spring force developed forces it against the outside wall of groove 22. Due to the inclined surfaces, a spring load develops between the lower surface of ring 21 and the upper flat surface of the rotating sleeve. When large pressures due to combustion are developed within the cylinder, the ring 21 is further forced against the above surfaces intensifying the seal. The ring 21 could be held stationary (pinned) with respect to the cylinder head 3 and slide against the upper part of the rotating sleeve or be held stationary with respect to the sleeve and rotate with respect to the cylinder head. The presence of lubricant and continuous rotation are ideal for hydrodynamic lubrication. Again, part of the sliding surface can be provided with pads Oust like a hydrodynamic thrust bearing and similar to the proposed compression ring design) to promote the formation of hydrodynamic lubrication. FIG. 9 shows the design of the conical seal with pads at the location appropriate when the seal is pinned on the cylinder head and slides in respect to the sleeve's flange. 45 shows an overall three-dimensional sketch of a section of the seal with the pads 46 imbedded in order not to compromise the sealing. 47 is a side view with the pads 46 shown with hidden lines. 46 is a view of the lower surface with pads 46 clearly visible. The depth of these pads is exaggerated in FIG. 9 for clarity. Note that the simulations discussed above also apply for the lubrication of the sliding surface of conical sealing ring of FIG. 5. However, due to the ring's location (further from the axis of rotation), this ring will enjoy a slightly higher sliding speed.

Alternative Embodiment: Sealing for High Peak Cylinder Pressure

The following embodiment is particularly desirable for an engine that develops high combustion pressures (i.e. turbocharged diesel engine). In such an engine, the cylinder sealing is more critical. Therefore, referring to FIG. 5, an additional compression ring 23 is fitted on groove 24 machined on the flange of the rotating sleeve. Any combustion gasses that escape the main conical seal 21 are trapped by ring 23. Since ring 23 isolates the conical ring 21 from oil coming from the area 8 (area between sleeve and cylinder), an additional oil supply 25 is provided to lubricate the conical seal as well as the interface of the upper part of the flange and cylinder head which acts as thrust bearing. A similar oil passage to 25 is provided on the opposite side and acts as oil return.

Alternative Embodiment: Adjusted Compression Ring Profile

Hydrodynamic lubrication requires some form of converging surfaces, in order for lubricant pressures to form and support the normal load. When the piston is at top dead center and the only motion that occurs is due to liner rotation, there is no apparent converging surface (the surfaces are parallel). However, in reality the surface irregularities of the honed rotating liner provide minor converging (a phenomenon called micro-hydrodynamic lubrication). However, in the following alternative embodiment, the ring profile can be adjusted in order to create converging surfaces just due to ring rotation without relying on the surface irregularities and thus reducing the necessary rotation for fully hydrodynamic lubrication. Referring to FIG. 6A, the conventional ring profile 49 is made out of the following portions. A flat portion 26 that acts as a sealing surface between the liner and the ring. Wedges 27 and 28 act as converging surfaces during the up and down motion respectively to promote formation of hydrodynamic pressure. Please note that the drawing has been exaggerated for clarity and wedge shape is so small that cannot be seen by the naked eye. Also, the shape is actually curved rather than angular as shown in FIG. 6. The new ring profile 50 (FIG. 6B) still maintains a flat portion 29 and is also provided with similar wedges at either edge 30 and 31. However, the depth of these wedges changes in the peripheral direction creating wedges in that direction as well. When the minimum wedge depth is reached, the same pattern is repeated. FIG. 8 shows the top view 42 of a section of the new compression ring. Two cross sections, 43 and 44 are also shown in order to demonstrate the variation of the wedge depth. The result is that converging surfaces in the direction of sleeve rotation are effectively created. Thus, the pressure support of the ring is increased for a given liner rotational speed. This embodiment is particularly desirable for diesel engines where the peak cylinder pressure is very high. Simulations show that with the proposed ring profile, the lubricant pressure can be indeed dramatically increased even with a relatively large film thickness reaching the magnitude of typical peak cylinder pressure for heavy duty diesel engines at full load. Note that the proposed ring profile increases the flat portion of the ring improving sealing and increasing the effectiveness of squeeze film lubrication at dead center. Part of the converging surface that enhances hydrodynamic lubrication due to up and down motion has been sacrificed. However, results from the models by Tian and coworkers (1996), Lawrence (1988) as well as several experimental studies indicate that under most operating conditions, there is more than sufficient film thickness at mid-stroke for hydrodynamic lubrication. Furthermore, since at least some liner rotation will be retained at mid-stroke, the converging surfaces at the peripheral direction will remain active and substitute for the overall reduction of the barrel shape.

Alternative Embodiment: Adjusted Ring Profile Applied to Conical Ring

In another alternative embodiment, a profile using the above concept can is applied on the pressure activated sealing devices. In other words, ring 21 and 23 (FIG. 5) have pads machined along their sealing surface in order to promote hydrodynamic lubricant pressure build up and avoid metal to metal contact. The pads are imbedded in the sliding surface of ring in order to allow tight sealing clearance in the rest of the surface. Note that the above simulations also apply for the lubrication of the lower flat sliding surface of conical sealing ring of previous embodiments. However, due to the ring's location (further from the axis of rotation), this ring will enjoy a slightly higher sliding speed. In addition to the surface irregularities, pads may be necessary to increase the film thickness when high gas pressure is encountered. Those pads can be similar in shape to typical hydrodynamic thrust bearings, but may have to be imbedded in the flat surface in order not to interfere with the sealing action. Also note that squeeze film lubrication will apply on this ring as well since the film thickness will be high before the gas pressure is raised.

Alternative Embodiment: Turbocharged Diesel Engine

The following alternative embodiment describes the invention as applied to a turbocharged diesel engine with the maximum torque (and thus maximum peak cylinder pressure) at 1200 rpm. The typical maximum pressure at the peak torque speed at full load for such an engine is about 100 atm. Referring to graph 7, the necessary liner speed in order to completely protect the liner and rings from metal to metal contact is around 3.5 m/s, if the proposed compression ring profile is to be used., For a 5.5 inch bore heavy duty engine, the resulting sleeve speed is 478 rpm. In the constant speed liner case, the gear ratio needs to be such that the gear 11 (FIG. 7) attached on sleeve will spin at 478 rpm when crank gear 14 spins at 1200. Thus, the necessary condition for the number of teeth of gears 11, 12, 15, and 14 is:

$$\frac{n_{14} \cdot n_{12}}{n_{15} \cdot n_{11}} = \frac{478}{1200}$$

Alternative Embodiment: Diesel Engine with Alternating Sleeve Speed

As an alternative embodiment, the variable sleeve speed will be applied on the diesel engine of the previous embodiment. In this case, the maximum instantaneous sleeve speed occurring when the piston is at a dead center needs to be 478 rpm. Simple kinematics of wheels 16 and 17 will give the required speed of wheel 17 and 16 (FIG. 3), and the corresponding gear ratios in order to achieve the liner speed of 478 rpm. The geometry of wheels 16 and 17 (distance of the two centerlines and radius of pivots on wheel 16) will be designed such that the required speed variation will be achieved. Note that the minimum speed should be chosen by two constraints. One is that the sleeve speed should not fall bellow a minimum necessary to retain the hydrodynamic film that support the sleeve. This minimum depends on the design of these bearings, viscosity lubricant used, the stroke to connecting rod length ratio and the cylinder pressure when the minimum speed occurs. The second is that an extreme speed variation could lead to excessive inertia loading on the driving mechanism which in turn will demand larger size gears to deal with the alternating inertia load.

Alternative Embodiment: Spark Ignition Engine

In the following alternative embodiment, the current invention is applied to a spark ignition engine, with a peak torque at 3000 rpm and a bore of 3.5 inches. The peak cylinder pressure at 3000 rpm is 50 atm. Referring to Graph 7, the required sleeve speed for full metal to metal protection at TDC is about 1.7 m/s. The corresponding sleeve speed is 365 rpm. For the constant sleeve speed, the gear ratio selection will be such that at 3000 crankshaft rpm, the sleeve gear spins at 365 rpm. The number of gear teeth selection is as above. For the alternating liner speed alternative embodiment, the maximum sleeve speed when the piston is at a dead center is 365 rpm.

Alternative Embodiment: Lubricant as Engine Coolant

In another alternative embodiment, the lubricant surrounding the rotating sleeve 1 in space 8 (FIG. 1) can be used as the sole coolant of the engine. The flow rate needs to be sufficient to remove all excess heat from the cylinder walls. In conventional water cooled engines, water jackets are machined or cast in the cylinder heads in which water flows for cooling. In this embodiment, those passages are filled with lubricant. The oil pump powers the lubricant flow through these cylinder head passages removing excess heat. The whole oil flow rate is also pumped through an oil cooler of sufficient capacity in order to dissipate this waist heat into ambient air. Thus, the water pump, water radiator, and coolant hoses are replaced with a larger oil cooler and oil pump in order to compensate for the extra complexity of the system. The benefit of this embodiment is that the incremental cost of the rotating sleeve engine in respect to a conventional engine ir reduced.

What is claimed is:

1. A poppet valved rotating sleeve internal combustion engine comprised of at least one cylinder, each cylinder comprised of:

a support means, such that the support means is recessed, where a portion of the recess serves as a cylinder head;

a cylindrical rotating sleeve means having a first end and a second end, such that the rotating sleeve means may rotate within the recess of the support means; such that the rotating sleeve means is oriented such that the first end is located approximately adjacent to the cylinder head; a piston means which reciprocates within the rotating sleeve means; a combustion chamber, the chamber being the variable volume between the reciprocating piston means, the rotating sleeve means, and the cylinder head; a piston sealing means, such that the piston sealing means provides a seal between the piston means and the rotating sleeve means; a sleeve driving means, such that the sleeve driving means causes the rotating sleeve means to rotate in order to maintain hydrodynamic lubrication between the piston/piston sealing means and the rotating sleeve means; a sleeve sealing means, such that the sleeve sealing means provides a seal between the rotating sleeve means and the cylinder head; an intake means, such that fuel and air may be introduced into the combustion chamber; and an exhaust means; such that combustion gasses can be removed from the combustion chamber.

2. The engine of claim 1, wherein:

a flange means is provided approximately along the exterior circumference of the first end of the rotating sleeve means adjacent to the cylinder head, such that the flange means provides reinforcement to the rotating sleeve means.

3. The engine of claim 2, wherein:

the sleeve sealing means is provided at the interface of the flange means and the cylinder head.

4. The engine of claim 1, wherein:

the rotating sleeve means is supported by at least one journal bearing means.

5. The engine of claim 1, wherein:

the sleeve driving means is a gear mechanism that transmits mechanical energy from a crankshaft to the rotating sleeve means.

6. The engine of claim 5, wherein:

the peak cylinder pressure of the engine is about 50 atm., and thus the gear ratio between the rotating sleeve and the crankshaft is such that at the most frequent operating crankshaft speed, the inner sleeve surface is approximately 1 to 4 m/s.

7. The engine of claim 5, wherein: about 2 to 5 m/s for diesel the peak cylinder pressure of the engine is about 100 atm., and thus the gear ratio between the rotating sleeve and the crankshaft is such that at the most frequent operating crankshaft speed, the inner sleeve surface is approximately 2 to 5 m/s.

8. The engine of claim 5, wherein:

the sleeve driving means is a variable speed means, such that the rotational speed of the rotating sleeve means may be varied as a function of the position of the piston means, and the maximum sleeve speed occurs when piston means approaches a dead center.

9. The engine of claim 5, wherein:

the variation in rotational speed of the rotating sleeve means is accomplished by a slotted and a pivoted wheel means.

10. The engine of claim 5, wherein:

the engine is comprised of more than one cylinder; and the sleeve driving means is a gear means, such that the gear means may drive more than one rotating sleeve means.

11. The engine of claim 1, wherein:

the piston sealing means is at least one compression ring means.

12. The engine of claim 11, wherein:

the piston means is grooved to accept the compression ring means;

the compression ring means is fixed relative to the rotating sleeve means; and the compression ring means is allowed to rotate with respect to the piston means.

13. The engine of claim 1, wherein:

an oil circulation means provides a circulation of a lubricant between the rotating sleeve means and the support means; and an oil cooling means is provided to remove heat from the lubricant.

14. A conical ring for sealing between a cylinder head and a rotating sleeve in a rotating sleeve engine, the sleeve having an integral flange with an upper surface essentially parallel to the cylinder head, the cylinder head having a groove to accept the conical ring, the groove positioned over a portion of the flange, the groove having a bottom face, a first side face, and a second inclined side face such that the second side face is outermost with respect to the sleeve, the second side face forming an acute angle with respect to the flange, the conical ring comprising:

a first inclined ring face, such that the first ring face has approximately the same slope as the second side face of the groove; and a second ring face, such that the second ring face has approximately the same slope as the upper surface of the flange, such that the ring provides a first mating surface between the first ring face and the second inclined side face of the groove, and a second mating surface between a portion of the upper surface of the flange and the second ring face, such that gas pressure from inside the sleeve forces the conical ring against the first mating surface and the second mating surface, thereby creating a seal between the rotating sleeve and the cylinder head.

15. The conical ring of claim 14 wherein a plurality of recessed pads are provided in at least one mating surface; such that the pads are tapered in the direction of rotation of the rotating sleeve, such that the pads serve the function of providing convergent surfaces to enhance the hydrodynamic lubrication of the conical ring.

16. The conical ring of claim 15 wherein the conical ring is pinned to the sleeve; and the plurality of pads are provided in the first inclined ring face.

17. The conical ring of claim 15 wherein the conical ring is pinned to the cylinder head; and the plurality of pads are provided in the second ring face.

18. A poppet valved rotating sleeve internal combustion engine comprised of at least one cylinder, each cylinder comprised of:

a support means, such that the support means is recessed, where a portion of the recess serves as a cylinder head, and such that at least one intake valve and at least one exhaust valve are integral to the cylinder head;

a rotating sleeve means having a first end and a second end, such that the rotating sleeve means may rotate within the recess of the support means, the rotating sleeve means oriented such that the first end is located approximately adjacent to the cylinder head, the rotating sleeve means having an inner essentially cylindrical surface and an outer essentially cylindrical surface, such that the rotating sleeve means may rotate within at least two journal bearing means integral to the support means; such that the clearance for the journal bearing means is within the range of about 0.002 to 0.004 inches, and such that the diameter to length ratio for the journal bearings is is bearing is within the range of about 3 to 4 and the wall thichness of the rotating approximately ⅛ to ⅜ inches;

a combustion chamber, the chamber being the variable volume between the reciprocating piston means, the rotating sleeve means, and the cylinder head;

a sleeve driving means, such that the sleeve driving means causes the rotating sleeve means to rotate in order to maintain hydrodynamic lubrication between the piston means and the rotating sleeve means;

a sleeve sealing means, such that the sleeve sealing means provides a seal between the rotating sleeve means and the cylinder head;

an intake means, such that a fuel/air mixture (spark ignition engines) and fresh air (compression ignition engines) may be introduced into the combustion chamber;

an exhaust means; such that combustion gasses can be removed from the combustion chamber;

a flange means integral to and substantially orthogonal to the first end of the outer essentially cylindrical surface of the rotating sleeve means, such that the flange means has a thickness of approximately 0.25 to 0.125 inch and such that the flange means extends approximately 0.25 inch beyond the outer essentially cylindrical surface of the rotating sleeve means, the flange means having an upper surface which opposes the support means such that thrust loads are to the cylinder heads and support means, the outer surface of the flange means supporting a sleeve sealing means which provides a seal between the rotating sleeve means and the cylinder head;

a piston means, such that the piston means may reciprocate within the inner essentially cylindrical surface of the rotating sleeve means, such that the reciprocation varies between a top dead center compressed position where the piston is located near the first end of the rotating sleeve means and a bottom dead center expanded position where the piston approaches the second end of the rotating sleeve means, and such that the piston means is grooved to accept at least one compression ring piston sealing means, such that the compression ring piston sealing means is fixed relative to the piston means;

a piston sealing means, such that the piston sealing means provides a seal between the piston means and the rotating sleeve means; and a sleeve driving means, such that the sleeve driving means causes the rotating sleeve means to rotate at a fixed rate for an engine with relatively high peak cylinder pressure, such that at the most frequent operating engine speed, the inside liner surface speed is approximately 2 to 5 m/s in order to maintain hydrodynamic lubrication between the piston means and the rotating sleeve means.

19. The engine of claim 18, wherein:

an oil circulation means provides a circulation of a lubricant between the rotating sleeve means and the support means; and an oil cooling means is provided to remove heat from the lubricant.

20. The engine of claim 18, wherein:

the sleeve driving means causes the rotating sleeve means to rotate at a fixed rate for an engine with relatively low peak cylinder pressure that corresponds to an inner liner surface speed of approximately 1 to 4 m/s at the most frequent operating speed in order to maintain hydrodynamic lubrication between the piston means and the rotating sleeve means.

21. The engine of claim 18, wherein:

the sleeve driving means is a slotted and a pivoted wheel means, such that the rotational speed of the rotating sleeve means may be varied as a function of the position of the piston means.

22. The engine of claim 18, wherein:

at least two compression ring means are provided to seal between the piston means and the rotating sleeve means.

23. A method for reducing piston assembly friction and for reducing piston ring and cylinder liner wear in a valved internal combustion engine, the method comprised of the steps of:

reciprocating the piston within a cylindrical sleeve;

rotating the cylindrical sleeve within each cylinder at a sufficeint speed to maintain hydrodynamic lubrication as the piston approaches top dead center and bottom dead center;

supporting the rotating cylindrical sleeve with at least two journal bearings;

providing a lubricant to the rotating cylindrical sleeve through special holes drilled within the journal bearings;

sealing between the rotating cylindrical sleeve and the cylinder head with at least one compression ring means;

sealing between the rotating cylindrical sleeve and the piston with at least one compression ring means located in a groove on the piston.

24. The method of claim 23 comprising the additional step of removing heat from the rotating cylindrical sleeve by cooling the lubricant.

25. The method of claim 23 comprising the additional step of varying the speed of rotation of the cylindrical sleeve.

26. A method for reducing piston assembly friction and for reducing piston ring and cylinder liner wear in a poppet-valved internal combustion engine, the method comprised of the steps of:

reciprocating the piston within a flanged cylindrical sleeve;

rotating the cylindrical sleeve within each cylinder at a variable speed sufficient to maintain hydrodynamic lubrication as the piston approaches top dead center and bottom dead center;

supporting the rotating cylindrical sleeve with at least two journal bearings;

providing a lubricant to the rotating cylindrical sleeve through the journal bearings;

cooling the lubricant to remove heat from the cylindrical sleeve;

sealing between the rotating cylindrical sleeve and the cylinder head with at least one compression ring means located on the interface of the sleeve and support means;

sealing between the rotating cylindrical sleeve and the piston with at least one compression ring means located in a groove on the piston.

* * * * *